United States Patent [19]

Seko et al.

[11] Patent Number: 4,463,347
[45] Date of Patent: Jul. 31, 1984

[54] DROWSINESS ALARM SYSTEM FOR A VEHICLE

[75] Inventors: Yasutoshi Seko, Yokohama; Takayuki Yanagishima, Yokosuka, both of Japan

[73] Assignee: Nissan Motor Company, Limited, Kanagawa, Japan

[21] Appl. No.: 304,254

[22] Filed: Sep. 21, 1981

[30] Foreign Application Priority Data

Sep. 22, 1980 [JP] Japan ............................ 55-135094[U]
Sep. 22, 1980 [JP] Japan ................................ 55-132060
Oct. 6, 1980 [JP] Japan ................................ 55-139661

[51] Int. Cl.³ ............................................ G08B 21/00
[52] U.S. Cl. ........................................ 340/576; 180/272
[58] Field of Search ......................... 340/576; 180/272

[56] References Cited

U.S. PATENT DOCUMENTS

| | | | |
|---|---|---|---|
| 3,654,599 | 4/1972 | Sepper | 340/576 |
| 4,005,398 | 1/1977 | Inoue et al. | 180/272 |
| 4,007,357 | 2/1977 | Yanagishima | 340/576 |
| 4,017,843 | 4/1977 | Yanagishima | 340/576 |
| 4,031,527 | 6/1977 | Yanagishima et al. | 340/576 |
| 4,058,796 | 11/1977 | Oishi et al. | 340/576 |
| 4,104,621 | 8/1978 | Yanagishima et al. | 340/576 |
| 4,224,609 | 9/1980 | Yanagishima et al. | 340/576 |
| 4,278,969 | 7/1981 | Woods | 340/576 |

FOREIGN PATENT DOCUMENTS 2042853 3/1972 Fed. Rep. of Germany .
2509354 12/1977 Fed. Rep. of Germany .

*Primary Examiner*—Glen R. Swann, III
*Attorney, Agent, or Firm*—Lowe, King, Price & Becker

[57] ABSTRACT

A drowsiness alarm system for a vehicle which gives an alarm to the vehicle driver when detecting a vehicle steering condition such as to indicate a state of drowsiness, thus preventing driving in an increasing state of drowsiness. The drowsiness alarm system, according to the present invention, comprises: (a) a steering angle detection circuit which outputs a first pulse whenever the vehicle driver turns the steering wheel in either of the clockwise and anticlockwise directions in excess of a predetermined angle; (b) a quick steering detection circuit which outputs a second pulse whenever the number of the first pulses reaches a predetermined number within a predetermined period of time; and (c) an alarm unit which gives an alarm in a predetermined form to the vehicle driver in response to the second pulse fed from the quick steering detection circuit. Furthermore, to ensure more accurate detection of the state of drowsiness, there may be provided in the drowsiness alarm system a frequency of steering detection circuit which outputs a third pulse when detecting an increasing frequency of steering changes, a vehicle speed sensor for inhibiting the alarming when the vehicle speed is below a predetermined value, or a vehicle condition responsive circuit for inhibiting the alarm when detecting that the vehicle travels in predetermined states such that the vehicle driver should not become drowsy, according to various vehicle driving conditions other than vehicle steering condition.

30 Claims, 26 Drawing Figures

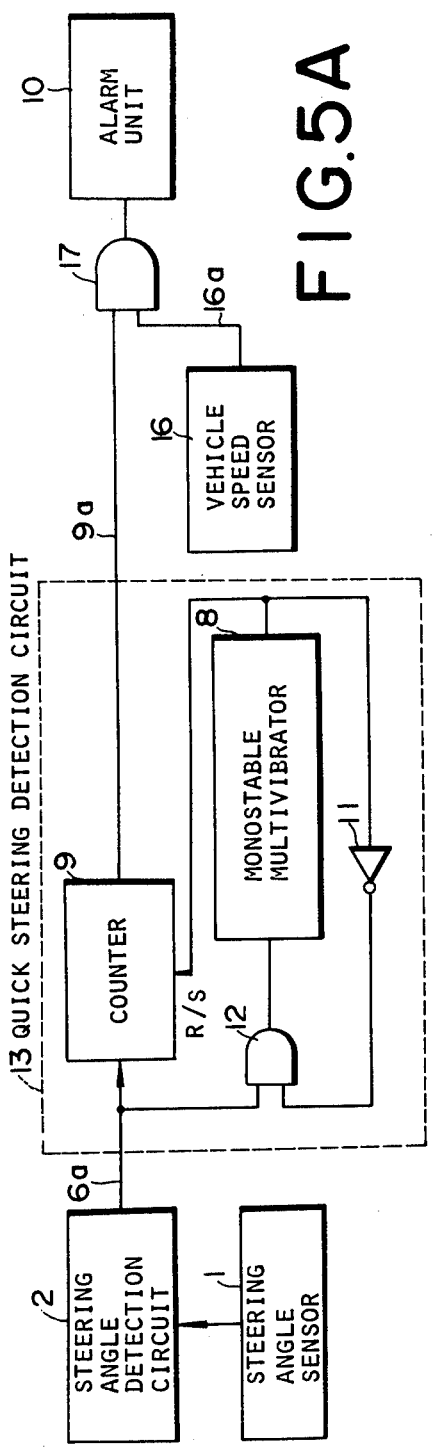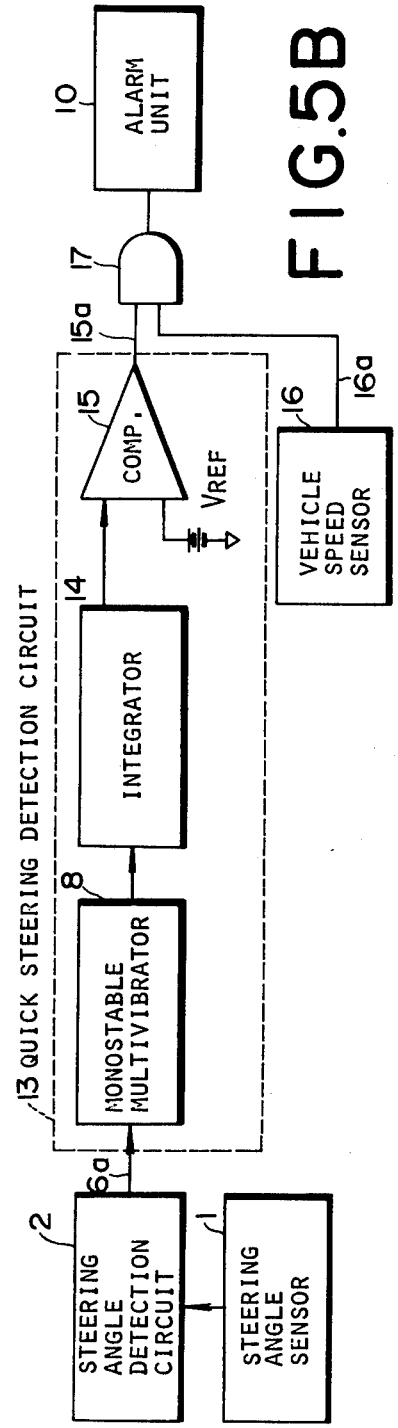

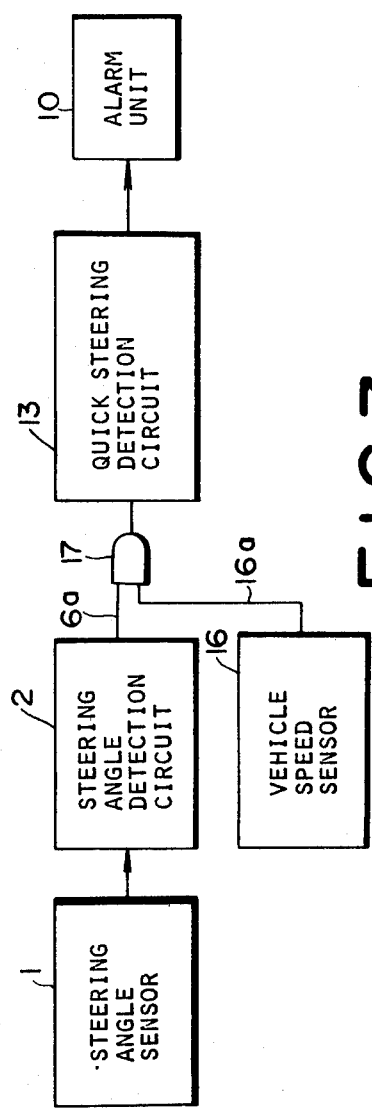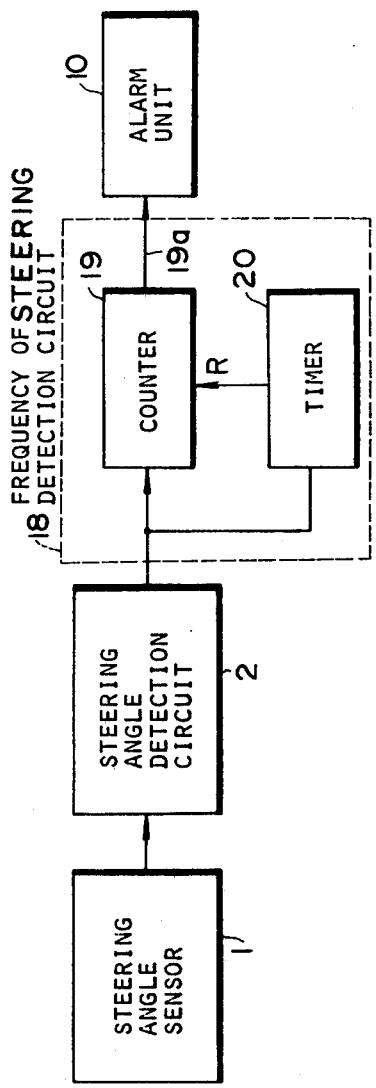

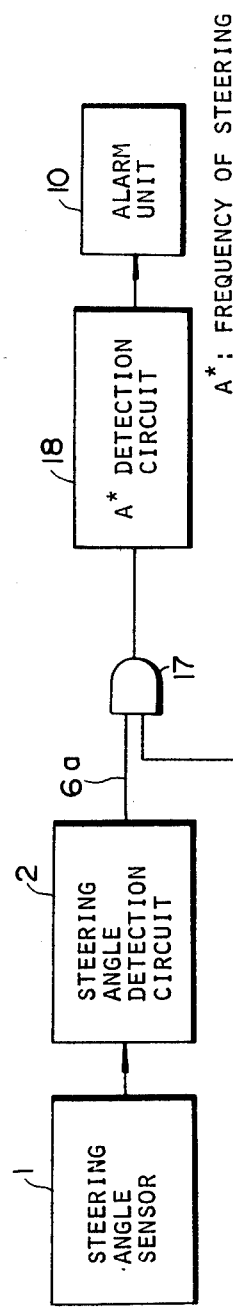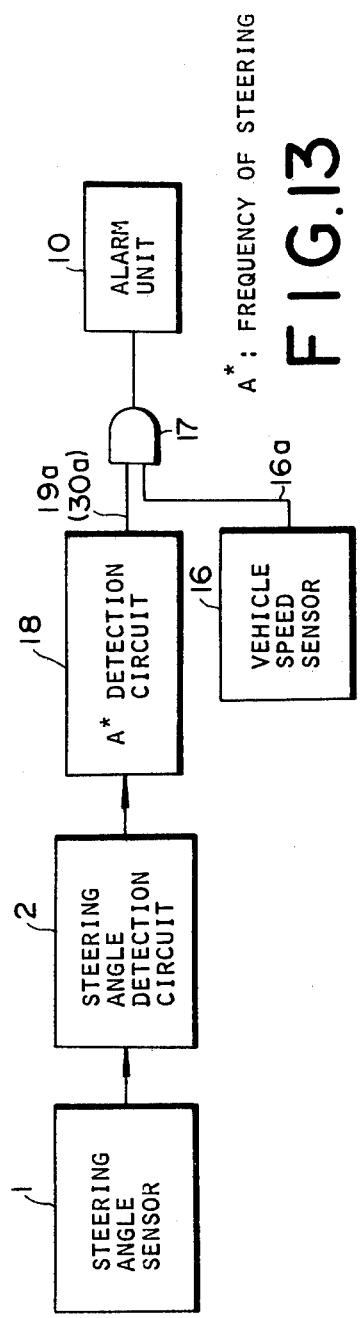

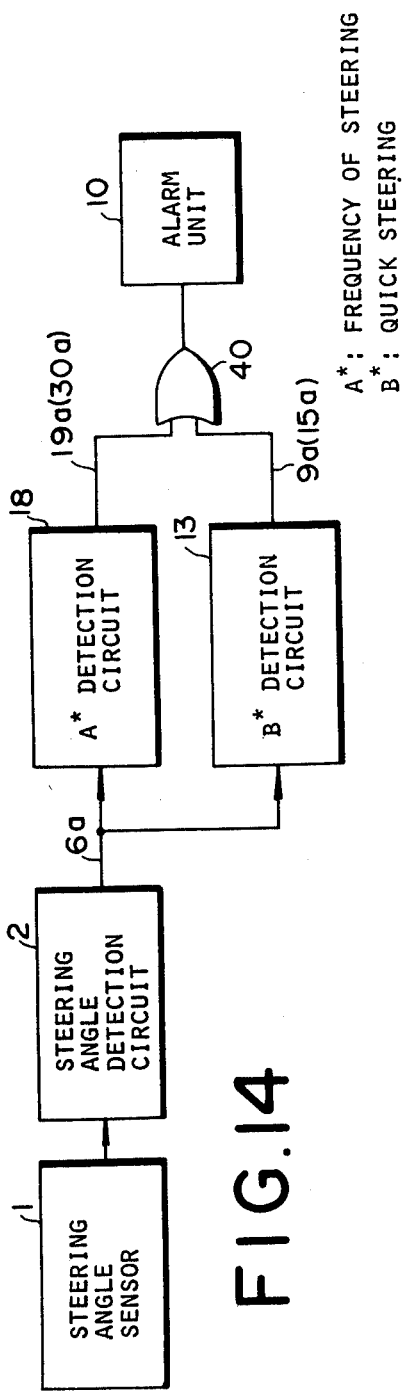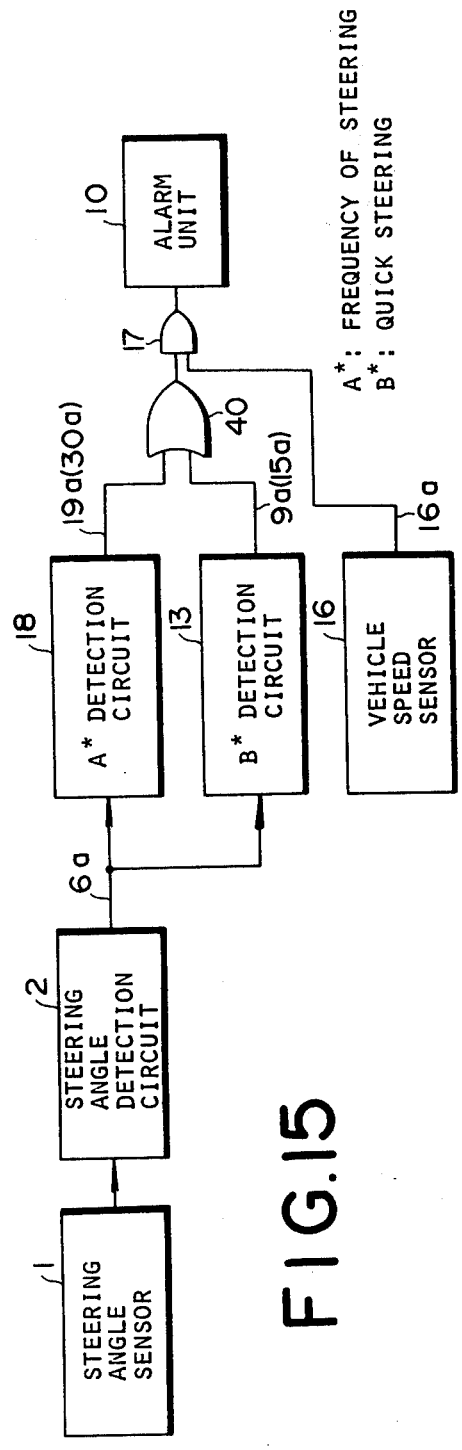

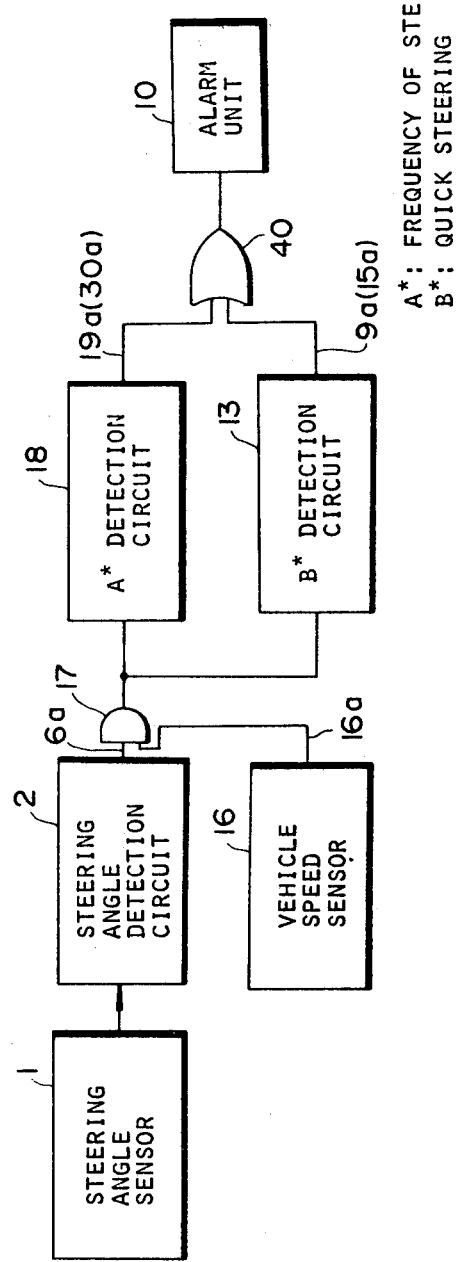

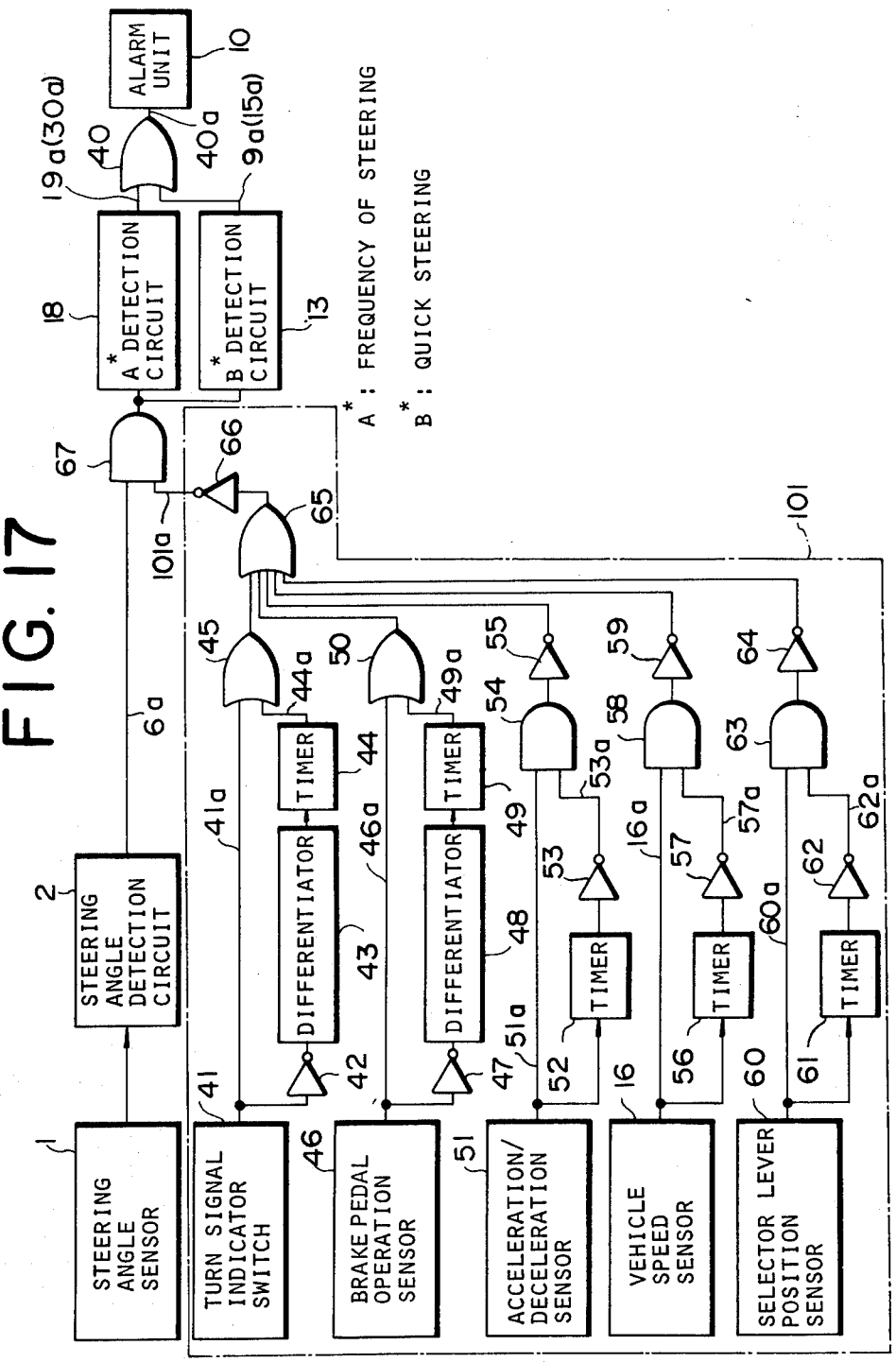

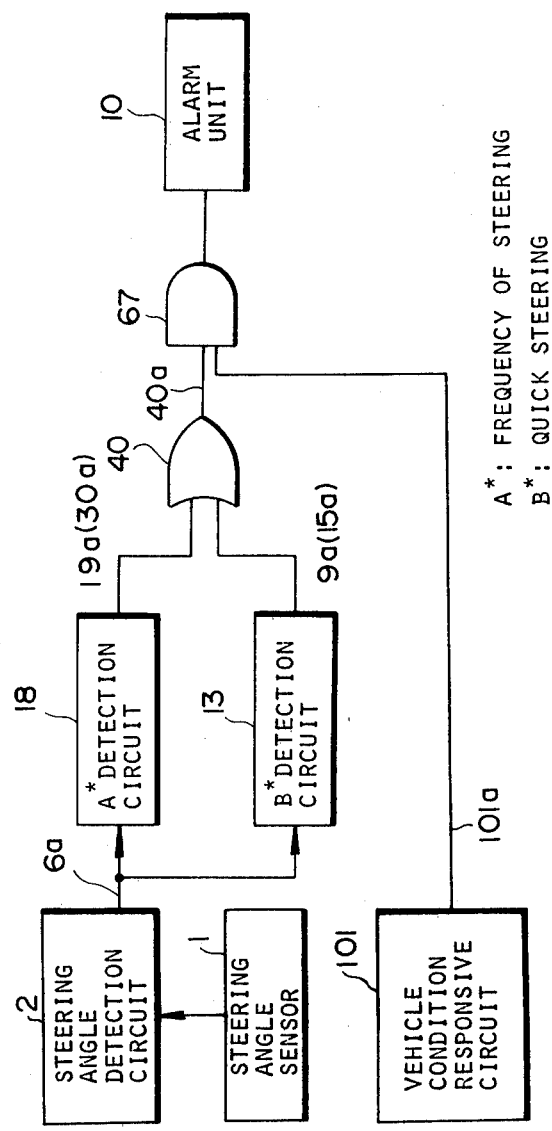

A*: FREQUENCY OF STEERING
B*: QUICK STEERING

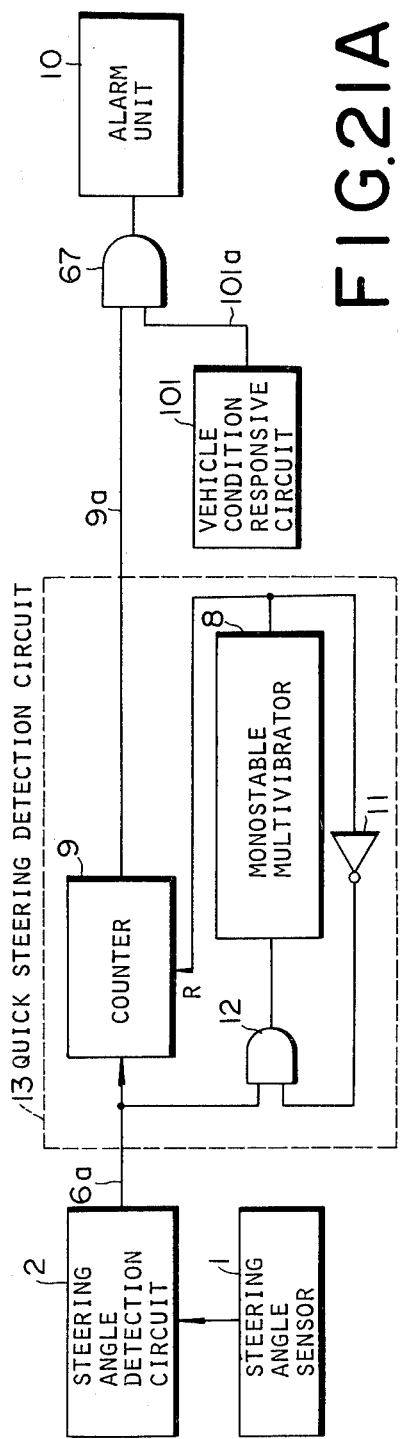
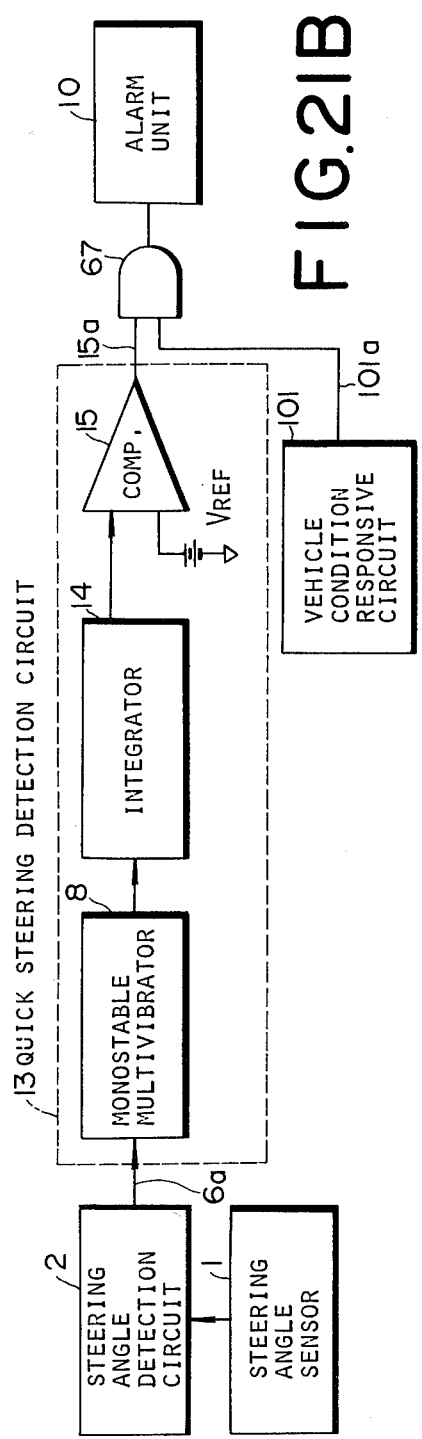

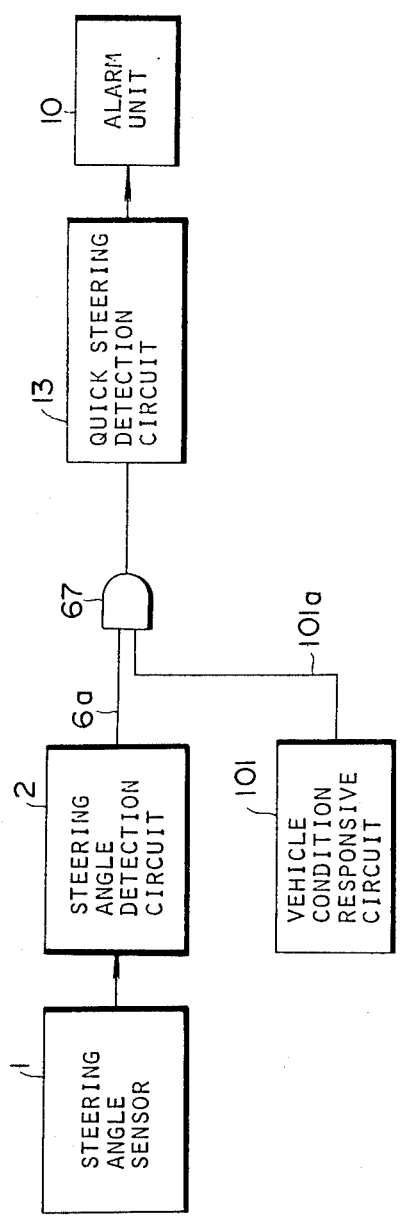
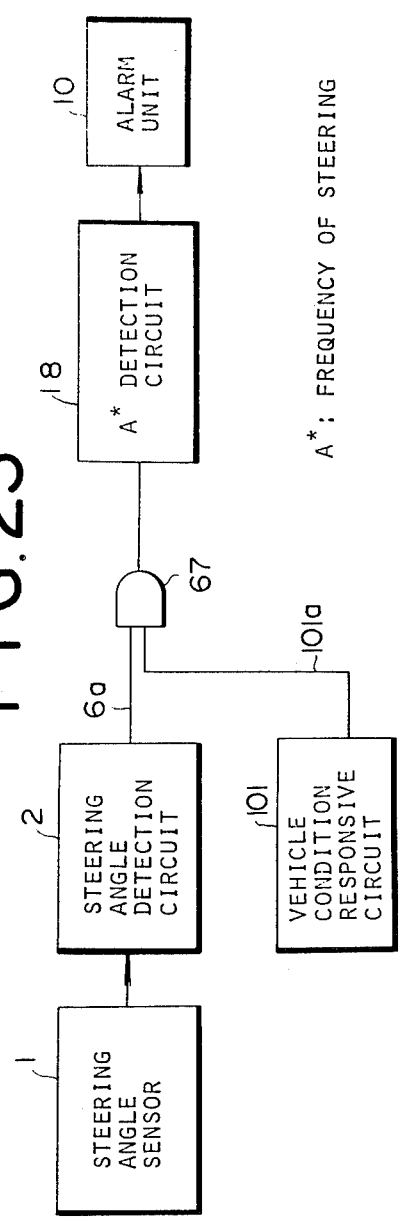
A*: FREQUENCY OF STEERING

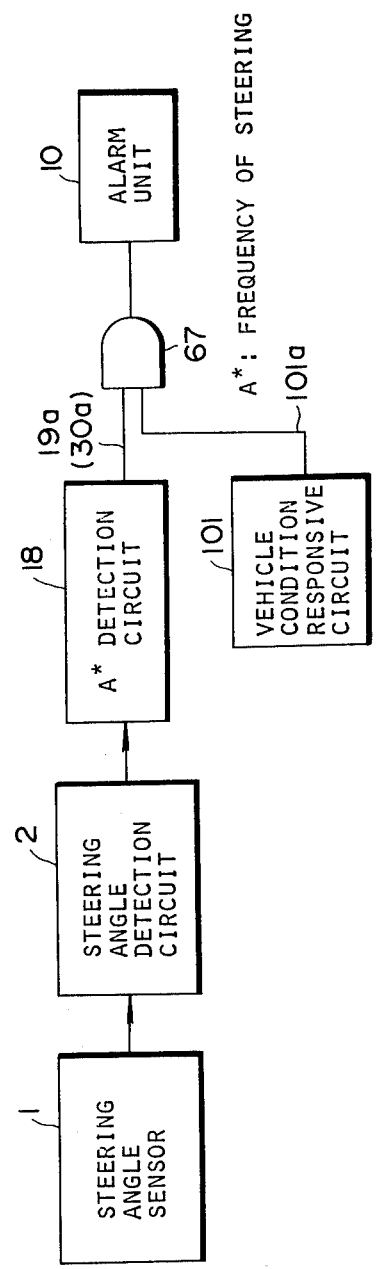

DROWSINESS ALARM SYSTEM FOR A VEHICLE

BACKGROUND OF THE INVENTION

Field of the Invention

The present invention relates to an alarm system for a vehicle such as an automotive vehicle which produces an alarm when the driver operates the car in a manner indicating a state of drowsiness, thereby to prevent driving in an increasing state of drowsiness.

SUMMARY OF THE INVENTION

It is a primary object of the present invention to provide a drowsiness alarm system for a vehicle which produces an alarm to the vehicle driver to prevent the driver from becoming increasingly drowsy by detecting unnecessary operations of the steering wheel resulting from the driver's failure to take necessary driving caution.

According to the present invention, this object is achieved by producing an alarm to the driver when the driver abruptly turns the steering wheel so quickly that a range of the steering angle change within a predetermined period of time exceeds a predetermined angular velocity after no steering change is performed for a certain interval and/or when the driver turns the steering wheel so frequently that the number of steering changes which exceed a predetermined steering angle in both clockwise and counterclockwise directions reaches a predetermined number within a predetermined period of time after no steering change is performed for a certain interval.

It is another object of the present invention to provide a drowsiness alarm system for a vehicle which responds to detected abrupt steering changes as described above and to increases in steering change frequencies except in conjunction with predetermined vehicle operating conditions. Examples of such conditions include brake pedal actuation, turn signal actuation, and the like.

It is still another object of the present invention to provide a drowsiness alarm system for a vehicle, the system responding to vehicle steering changes only during the occurrence of predetermined vehicle operating conditions. Such conditions may be, for example, vehicle speed greater than a predetermined value for a predetermined period of time and so forth. Also, within the context of the appended claims, such a vehicle condition may also be the absence of a given vehicle condition for a predetermined time, as, for example, the absence of a brake or turn signal for a predetermined time interval.

Still more specifically, it is an object of the present invention to provide an alarm system for a vehicle which inhibits the alarm when a turn signal indicator switch light is blinking and within a predetermined period of time after the turn signal indicator switch light is extinguished, when a brake pedal is depressed and within a predetermined period of time after the brake pedal is released, when an accelerator pedal is fully depressed or released for abruptly accelerating or decelerating the vehicle, and until a predetermined period of time thereafter, the instant when the accelerator pedal is depressed and released within a predetermined range of stroke after the abrupt acceleration or deceleration, when the vehicle travels at a speed below a predetermined value and within a predetermined period of time after the vehicle speed is changed to above the predetermined value of speed, or when a gear selector lever is placed at a position other than a top or overdrive position and within a predetermined period of time after the selector lever is placed at the top or overdrive position and otherwise gives an alarm at the time of increased frequency of steering change and/or quick steering as described in the primary object of the present invention.

BRIEF DESCRIPTION OF THE DRAWINGS

The features and advantages of the alarm system according to the present invention will be better appreciated from the following description taken in conjunction with the accompanying drawings in which like reference numerals designate corresponding elements, and in which:

FIG. 5A is a simplified circuit block diagram showing a third preferred embodiment of the drowsiness alarm system according to the present invention;

FIG. 5B is a simplified circuit block diagram showing another example of the third preferred embodiment shown in FIG. 5A.

FIG. 6 is a simplified circuit block diagram of a fourth preferred embodiment of the drowsiness alarm system according to the present invention;

FIG. 7 is a simplified circuit block diagram of a fifth preferred embodiment of the drowsiness alarm system according to the present invention;

FIG. 12 is a simplified circuit block diagram showing a seventh preferred embodiment of the drowsiness alarm system according to the present invention;

FIG. 13 is a simplified circuit block diagram showing another example of the seventh preferred embodiment shown in FIG. 12;

FIG. 14 is a simplified circuit block diagram showing an eighth preferred embodiment of the drowsiness alarm system according to the present invention;

FIG. 15 is a simplified circuit block diagram showing a ninth preferred embodiment of the drowsiness alarm system according to the present invention;

FIG. 16 is another example of the ninth preferred embodiment shown in FIG. 15;

FIG. 17 is a simplified circuit block diagram of a tenth preferred embodiment of the drowsiness alarm system according to the present invention;

FIG. 18 is a simplified circuit block diagram showing another example of the tenth preferred embodiment shown in FIG. 17;

FIG. 21A is a simplified circuit block diagram showing a twelfth preferred embodiment of the drowsiness alarm system according to the present invention;

FIG. 21B is a simplified circuit block diagram showing another example of the twelfth preferred embodiment shown in FIG. 21A;

FIG. 22 is a simplified circuit block diagram showing still another example of the twelfth preferred embodiment shown in FIGS. 21A and 21B;

FIG. 23 is a simplified circuit block diagram showing a thirteenth preferred embodiment of the drowsiness alarm system according to the present invention; and FIG. 24 is a simplified circuit block diagram showing another example of the thirteenth preferred embodiment shown in FIG. 23.

DESCRIPTION OF THE PREFERRED EMBODIMENTS

Reference will be made to the drawings and first to FIG. 1 which shows a first preferred embodiment of the drowsiness alarm system for a vehicle according to the present invention.

Figure 1:
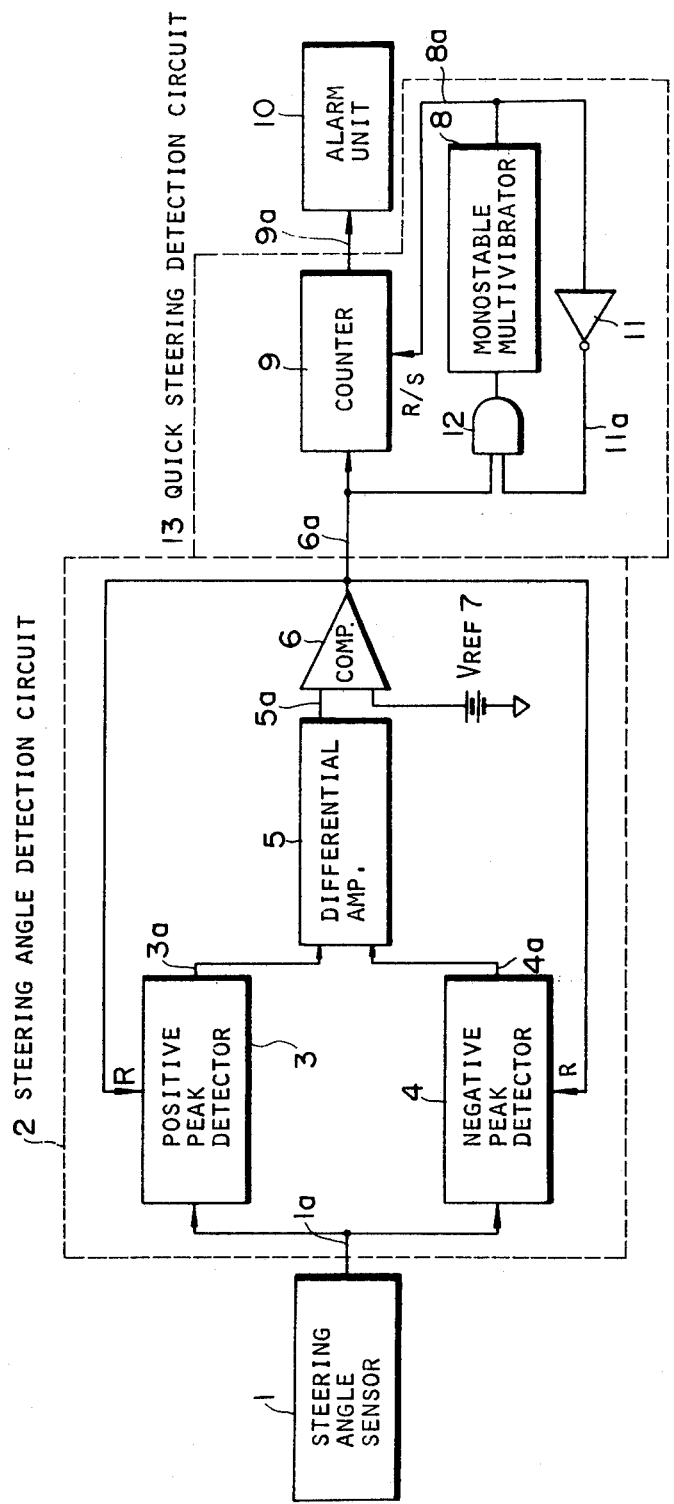
FIG. 1 is a simplified circuit block diagram showing a first preferred embodiment of a drowsiness alarm system for a vehicle according to the present invention.
Figure 2:
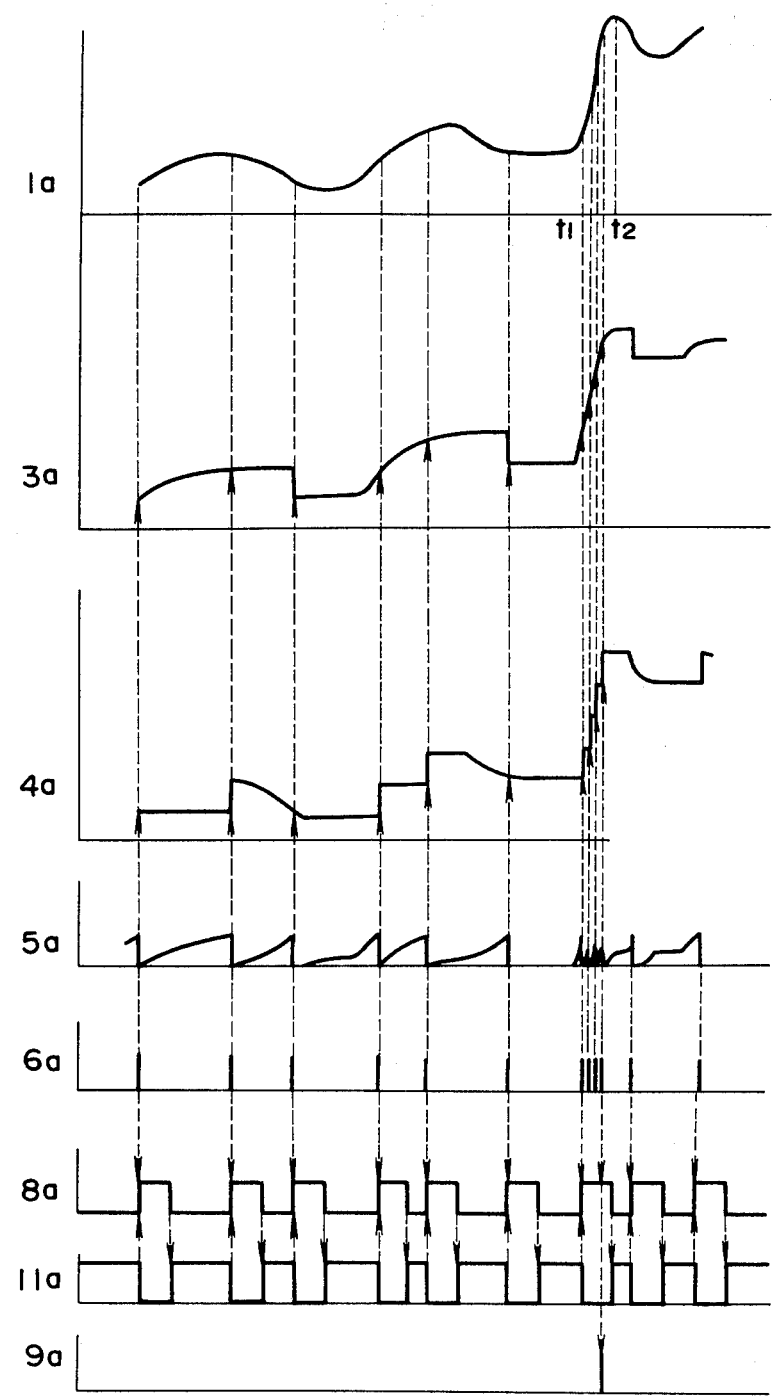
FIG. 2 is a signal timing chart for the circuit of the drowsiness alarm system in the first preferred embodiment shown in FIG. 1.

In FIG. 1, numeral 1 denotes a steering angle sensor, which produces a steering angle signal 1a, e.g., as shown in FIG. 2 according to the rotation angle of a steering wheel (not shown). Numeral 2 denotes a steering angle detection circuit comprising a positive peak detector 3, connected to the steering angle sensor 1, a negative peak detector 4, connected to the steering angle sensor 1, a differential amplifier 5, connected to both positive and negative peak detectors 3 and 4, and a first comparator 6, connected to the differential amplifier 5 and to a reference voltage power supply $V_{REF}$.

The positive peak detector 3 operates to hold a local maximum value of the steering angle signal 1a as shown in a waveform timing chart of FIG. 2, while the negative peak detector 4 operates to hold a local minimum value of the steering angle signal 1a as shown in the waveform timing chart of FIG. 2. The positive peak detector 3 comprises, e.g., in a well-known construction a diode, the anode terminal of which is connected to the steering angle sensor 1 and the cathode terminal of which is connected to a capacitor connected to ground and a reset switch connected via a reference voltage to ground. The negative peak detector 4 is of similar construction, except that the diode is of reverse polarity to that of the positive peak detector 3. The differential amplifier 5 outputs a difference signal 5a representing the level difference between output signals 3a and 4a of the positive and negative peak detectors 3 and 4 respectively, as shown in FIG. 2. The comparator 6, comprising, e.g., an operational amplifier, compares the difference signal 5a with the reference voltage $V_{REF}$ and outputs a first pulse signal 6a at the instant when the level of the difference signal 5a reaches the level of reference voltage $V_{REF}$. The reference voltage $V_{REF}$ corresponds to a predetermined change of steering angle. The first pulse signal 6a from the first comparator 6 is fed to both positive and negative peak detectors 3 and 4 for resetting both positive and negative peak detectors 3 and 4 synchronously with each pulse of the signal 6a and as shown in FIG. 2.

A quick steering detection circuit 13 comprises a first counter 9, first AND gate 12, both having inputs connected to the output of the first comparator 6, first monostable multivibrator 8, connected between a reset terminal of the counter 9 and output terminal of the first AND gate 12, a first inverter 11 connected between an output terminal of the first monostable multivibrator 8 and another input terminal of the first AND gate 12. The output terminal of the first counter 9 is connected to an alarm unit 10. The alarm unit 10 produces an alarm of a predetermined form in response to an output pulse signal 9a from the first counter 9.

The operation of the drowsiness alarm system in the first preferred embodiment is described hereinafter with reference to the timing chart of FIG. 2.

The steering angle signal 1a outputted from the steering angle sensor 1 is, e.g., a positive voltage level proportional to the absolute displacement of the steering wheel from its equilibrium position. The positive and negative peak detectors 3 and 4 output a maximum value signal 3a and minimum value signal 4a, respectively. The differential amplifier 5 outputs the difference signal 5a in response to the maximum and minimum value signals 3a and 4a and the first comparator 6 outputs the first pulse signal 6a when the difference signal 5a reaches the level of reference voltage $V_{REF}$. Since the level of the output signal 11a of the first inverter 11 is at a logical "1" (positive logic system is used) when the level of the output signal 8a of the first monostable multivibrator 8 is at a logic "0", the output first pulse signal 6a from the first comparator 6 is passed through the first AND gate 12 to turn the first monostable multivibrator 8 on. When the value of the level change of the steering angle signal 1a within a predetermined period of time exceeds a predetermined value, such as in a time interval between $t_1$ and $t_2$ of FIG. 2, the number of pulses inputted in the first counter 9 reaches a predetermined number and consequently the first counter 9 provides the alarm signal 9a for the alarm unit 10. The alarm signal 9a causes the alarm unit 10 to produce an alarm for the vehicle driver in such forms as a buzzer sound, lamp or pictorial indication, and vocal sound, or, alternatively by blowing a gust of wind at the vehicle driver from an air conditioner. In the first preferred embodiment described hereinabove, e.g., assuming that the pulse width interval of the first monostable multivibrator 8 is 0.5 seconds, the output first pulse 6a of the first comparator 6 appears whenever the steering wheel is rotated through an angle of 5°, and the maximum countable number of the first counter 9 is four, the alarm is given when the steering angle changes at a average rate of 40°/sec (angular velocity of the steering wheel is 40°/sec).

Figure 3:
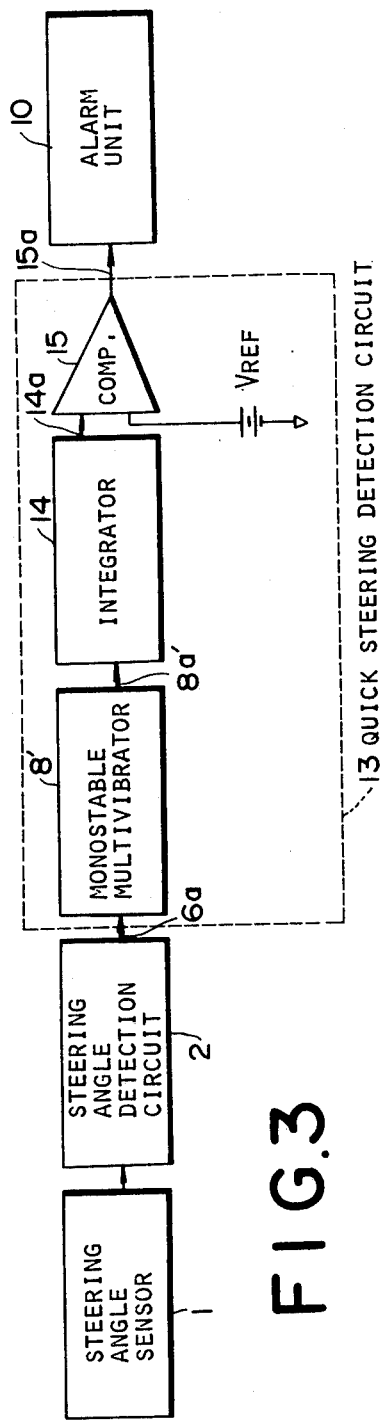
FIG. 3 is a simplified circuit block diagram showing a second preferred embodiment of the drowsiness alarm system according to the present invention.

FIG. 3 is a simplified block diagram showing a second preferred embodiment of the drowsiness alarm system according to the present invention. As seen from FIG. 3, the drowsiness alarm system comprises the steering angle sensor 1, steering angle detection circuit 2, quick steering detection circuit 13, and alarm unit 10. The construction of steering angle detection circuit 2 and alarm unit 10 are the same as shown in FIG. 1. In this preferred embodiment, the quick steering detection circuit 13 comprises a second monostable multivibrator 8', integrator 14, and second comparator 15.

The operation of the drowsiness alarm system of the second preferred embodiment is described hereinafter with reference to a signal timing chart of FIG. 4.

Figure 4:
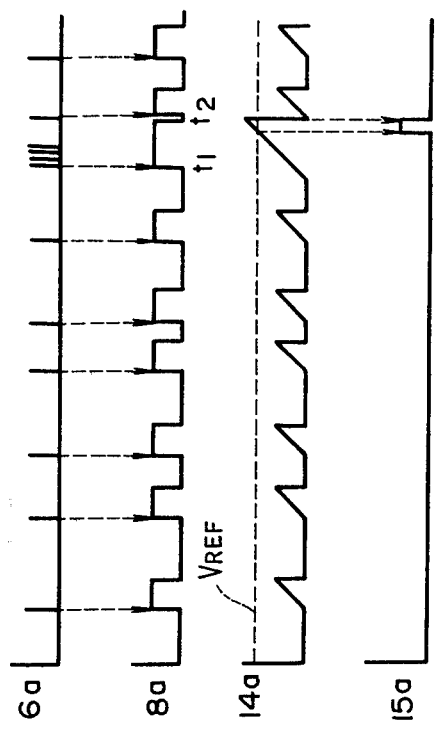
FIG. 4 is a signal timing chart for the circuit of the drowsiness alarm system in the second prefered embodiment shown in FIG. 3.

When a pulse 6a outputted from the first comparator 6 of the steering angle detection circuit 2 is received by the second monostable multivibrator 8' within a pulse duration of the second monostable multivibrator 8', the pulse width cycle is restarted so that the output pulse duration of the second multivibrator 8' is extended, as in the time interval between $t_1$ and $t_2$ shown in FIG. 4. In this case, the voltage level integrated by the integrator 14 exceeds the reference voltage $V_{REF}$ of the second comparator 15 so that the alarm unit 10 receives an output pulse 15a from the second comparator 15 and produces an alarm, in such forms as described above, to the vehicle operator.

FIG. 5A is a simplified block diagram showing a third preferred embodiment of the drowsiness alarm system according to the present invention. This embodiment includes, in addition to the construction of the drowsiness alarm system described as in the first preferred embodiment shown by FIG. 1, a vehicle speed sensor 16 having an output signal 16a, which produces a high-level (logic "1") signal when the vehicle exceeds a predetermined speed, and a second AND gate 17, connected between the output terminal of the first counter 9 and input terminal of the alarm unit 10 and receiving the vehicle speed sensor signal as a second input. Therefore, the output alarm signal 9a from the first counter 9 of the quick steering detection circuit 13 is enabled by the second AND gate 17 only when the vehicle speed exceeds the predetermined value. Consequently, the alarm is disabled when the vehicle travels on a city street, etc., at a low speed below the predetermined value of speed.

FIG. 5B shows another example of the third preferred embodiment shown in FIG. 5A, wherein the second AND gate 17 receives parallel inputs from the vehicle speed sensor 16 and the quick steering detection circuit 13, the internal circuit of which is shown in FIG. 3, and the output of the second AND gate 17 leads to the alarm unit 10.

FIG. 6 shows a fourth preferred embodiment of the drowsiness alarm system according to the present invention, wherein the vehicle speed sensor 16 is connected to one input of the second AND gate 17 which receives at its other input the output of steering angle detection circuit 2. The output of the second AND gate 17 leads to the quick steering detection circuit 13 for enabling the passage of the first pulse 6a from the steering angle detection circuit 2 only when the high-level voltage signal 16a is inputted from the vehicle speed sensor 16 to the second AND gate 17.

FIG. 7 is a simplified circuit block diagram showing a fifth preferred embodiment of the drowsiness alarm system for a vehicle. The drowsiness alarm system in this preferred embodiment comprises: the steering angle sensor 1 which outputs the voltage signal according to the steering angle as described hereinbefore; the steering angle detection circuit 2 which outputs the steering angle pulse (first pulse) whenever the steering angle is changed by a predetermined angle, e.g., 5°; and a frequency of steering detection unit 18. The latter includes a first timer 20 which outputs a pulse whenever a predetermined period of time (e.g. 15 seconds) has passed after inputting the steering angle pulse signal (first pulse) from the steering angle detection circuit 2; and a second counter 19 which counts the number of first pulses fed from the steering angle detection circuit 2, resettable by the output pulse from the first timer 20. The structure further includes alarm unit 10 which produces an alarm in such forms as described hereinbefore in response to the output signal of the second counter 19. It will be noted that the alarm unit 10 has an alarm device for performing a pictorial display, lamp indication, buzzer sound, cooling wind ejection from an air conditioner, etc.

In the construction described above, the steering angle detection circuit 2 outputs a first pulse (steering angle pulse signal) whenever the steering angle is changed by a predetermined angle, e.g., 50°, in response to the steering angle signal from the steering angle sensor 1. The second counter 19 counts the number of the first pulses outputted from the steering angle detection circuit 2, is reset by the pulse signal from the timer 20 outputted whenever the predetermined period of time (e.g. 15 seconds) has passed, and outputs an alarm signal when the counted value arrives at a predetermined value to elicit an alarm from the alarm unit 10. The constructions of the steering angle sensor 1 and steering angle detection circuit 2 are the same as in the first preferred embodiment as shown in part of FIG. 1.

Figure 8:
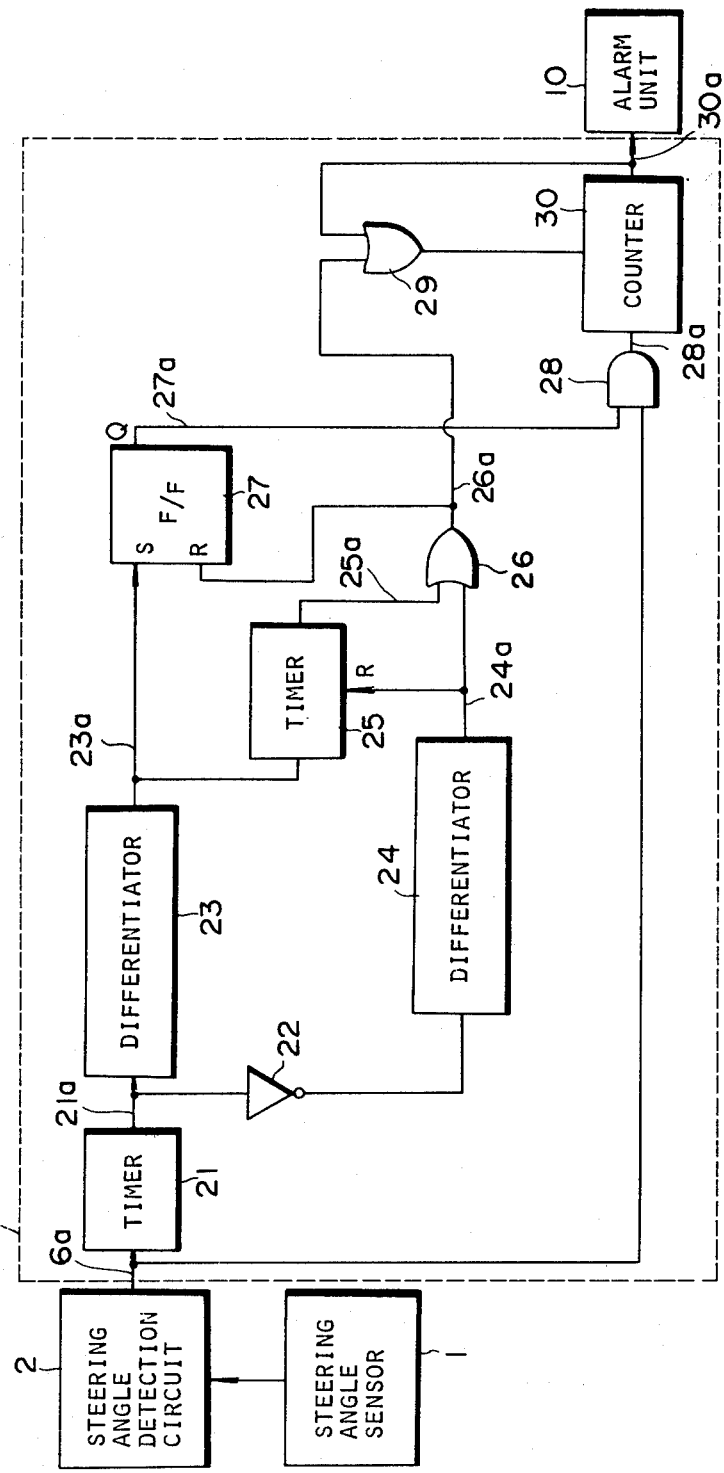
FIG. 8 is a simplified circuit block diagram showing another example of the fifth preferred embodiment shown in FIG. 7.

FIG. 8 is a simplified block diagram showing another example of the drowsiness alarm system in the fifth preferred embodiment shown in FIG. 7, wherein the alarm is produced in response to an increase in the frequency of steering operations after a steering operation is not performed for a certain period of time.

The drowsiness alarm system shown in FIG. 8 comprises: (a) the steering angle sensor 1 of the same construction as described in the first preferred embodiment; (b) the steering angle detection circuit 2 of the same construction as described in the first preferred embodiment; (c) the frequency of steering detection circuit 18; and (d) the alarm unit 10 as described previously.

The embodiment of the frequency of steering detection circuit 18 shown in FIG. 8 comprises: (a) a second timer 21 which outputs a high-level signal for a predetermined period of time, e.g., 5 seconds, whenever the pulse signal from the steering angle detection circuit 2 is inputted; (b) a first differentiator 23 which differentiates the high-level signal from the timer 21 so as to detect the rising edge of the high-level signal of the timer 21; (c) a second inverter 22 and second differentiator 24 which differentiates the inverted signal of the high-level signal from the second timer 21 so as to detect the falling edge of the high-level signal of the second timer 21; (d) a third timer 25, connected to the first differentiator 23, which starts counting time in response to the output pulse from the first differentiator 23 and is reset by the output pulse from the second differentiator 24; (e) a R/S flip-flop 27, the set terminal of which is connected to the first differentiator 23 and reset terminal of which is connected to the output terminal of a first OR gate 26; (f) a third AND gate 28 which receives as inputs the output signals from the R/S flip-flop 27 and steering angle detection circuit 2; a third counter 30, connected to the output of the third AND gate 28, which counts the output signal from the third AND gate 28 and outputs an alarm signal when the counted value reaches a predetermined value; and (g) a second OR gate 29, one input terminal of which is connected to the output terminal of the first OR gate 26 and another input terminal of which is connected to an output terminal of the third counter 30, which sends a reset signal to the third counter 30 in response to high-level output signals from either the first OR gate 26 or the third counter 30 itself.

Figure 9:
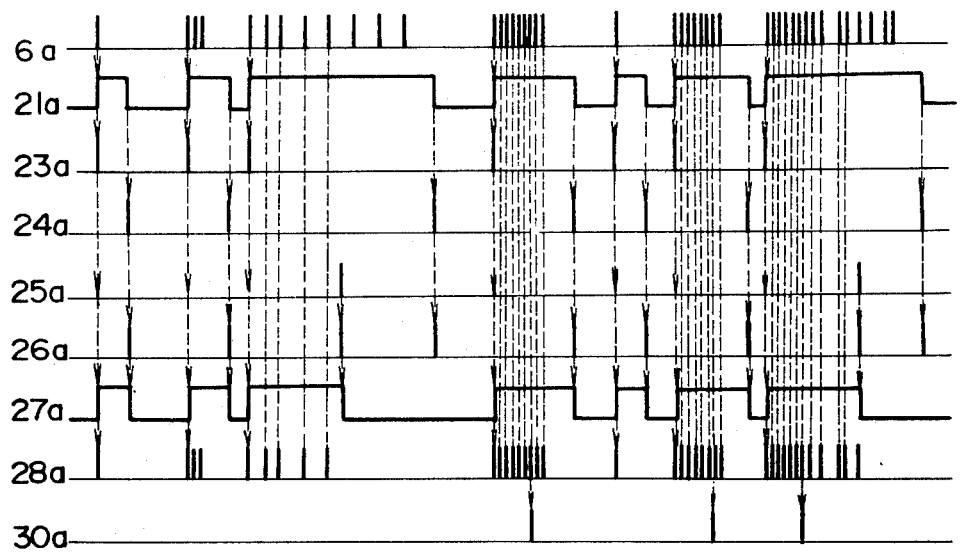
FIG. 9 is a signal timing chart for the circuit shown in FIG. 8.

In the construction described above, the operation of the fifth preferred embodiment is described hereinafter with reference to a signal timing chart of FIG. 9.

Whenever the second timer 21 receives the output pulse from the steering angle detection circuit 2, the second timer 21 outputs a high-level signal (logic "1") for a predetermined period of time, e.g., 5 seconds (the duration of the high-level signal is restarted when the subsequent pulse is received during the high-level signal outputted therefrom). The first differentiator 23 outputs a pulse 23a upon detecting the rising edge of the high-level signal 21a of the second timer 21, while the second differentiator 24 outputs a pulse 24a upon detecting the falling edge of the high-level signal 21a of the timer 21. Therefore, the pulse 24a outputted from the second differentiator 24 indicates that an interval of time between the pulses 6a outputted from the steering angle detection circuit 2 exceeds the output pulse duration of the second timer 21 (i.e., in this example 5 seconds). The third timer 25 starts counting time in response to the input pulse 23a from the first differentiator 23 so as to count towards a time limit, e.g., 15 seconds, and the count is reset in response to a reset pulse 24a from the second differentiator 24. In other words, when the pulses from the steering angle detection circuit 2 are repeatedly outputted with time intervals of less than 5 seconds, the third timer 25 continuously performs the counting towards 15 seconds, since second timer 21 is triggered by each pulse. The first OR gate 26 takes the logical OR of the outputs 24a and 25a of the second differentiator and the third timer 24 and 25 respectively to output a pulse 26a in response to a high-level pulse from either output. The R/S flip-flop 27 (abbreviated as F/F in FIG. 8) is set by an output pulse 23a from the first differentiator 23 and reset by an output pulse 26a from the first OR gate 26. The third AND gate 28 passes an output pulse 6a from the steering angle detection circuit 2 as a pulse 28a via the Q output terminal of the R/S flip-flop 27 and the third counter 30 counts the number of pulses 28a from the third AND gate 28. When the counter number reaches a predetermined value (e.g., seven), the alarm signal 30a is outputted therefrom. The third counter 30 is reset by a high-level output signal 26a from either the first OR gate 26 or the alarm signal 30a.

Figure 10:
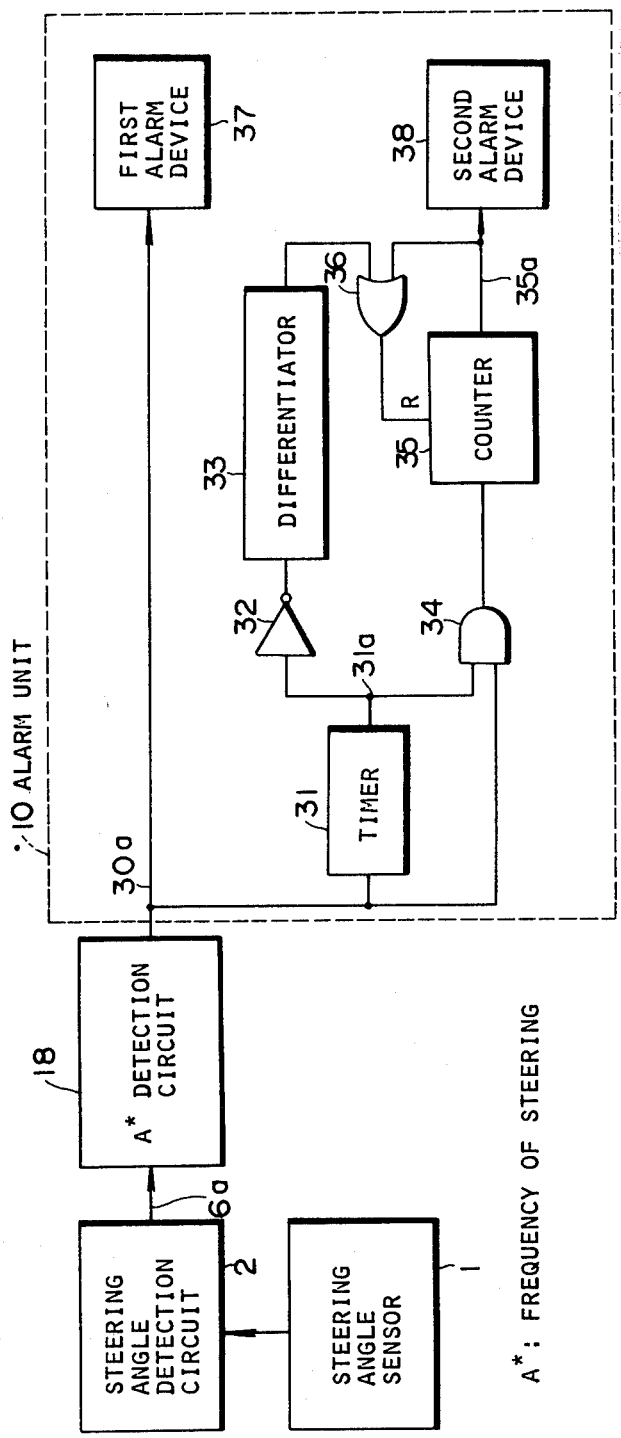
FIG. 10 is a simplified circuit block diagram showing a sixth preferred embodiment of the drowsiness alarm system according to the present invention.

FIG. 10 is a simplified block diagram showing a sixth preferred embodiment of the drowsiness alarm system, wherein the same reference numerals denote corresponding elements. In this embodiment, the alarm unit comprises: (a) a fourth timer 31 which outputs a logic "1" (high-level) for a predetermined period of time when the frequency of steering detection circuit 18 outputs the alarm pulse signal 30a (or 19a as shown in FIG. 7); (b) a third differentiator 33 which differentiates an inverted signal from a third inverter 32 and outputs a pulse representing the falling edge of the output high-level signal from the fourth timer 31; (c) an fourth AND gate 34, one input terminal of which is connected to the output terminal of the fourth timer 31 and another input terminal of which is connected to the input terminal of the fourth timer 31; (d) a fourth counter 35 which counts the number of output pulses from the fourth AND gate 34 and outputs another alarm signal when the counted value reaches a predetermined value; (e) a first alarm device 37 connected to the output terminal of the third counter 30 of the frequency of steering detection circuit 18; (f) a second alarm device 38 connected to the fourth counter 35; and (g) a third OR gate 36 receiving as inputs the outputs of the fourth counter 35 and the third differentiator 33, and outputting a signal to the reset terminal of the fourth counter 35.

Figure 11:
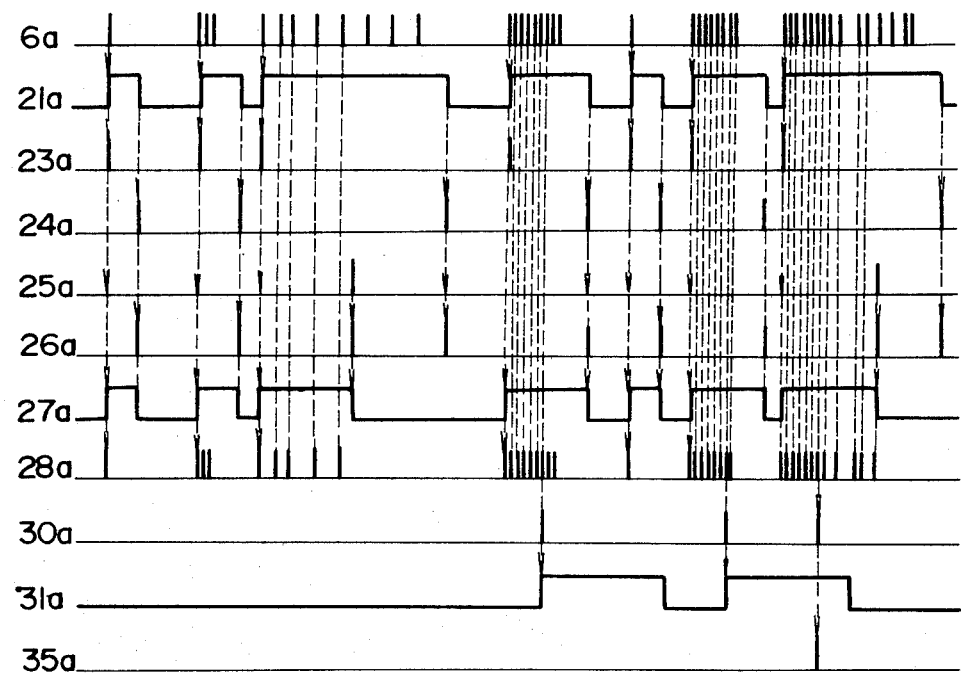
FIG. 11 is a signal timing chart for the circuit shown in FIG. 10.

The operation of the drowsiness alarm system in the sixth preferred embodiment is described with reference to a signal timing chart of FIG. 11.

When the alarm signal 30a is outputted from the third counter 30 of the frequency of steering detection circuit 18, the first alarm device 37 gives an alarm in a gentle form such as a pictorial display or lamp indication, etc. When subsequent alarm signals 30a are outputted during the alarming by the first alarm device 37, the fourth counter 35 counts the number of alarm signals 30a (19a) via the fourth AND gate 34 and outputs a second alarm signal 35a when the counted number reaches a predetermined value, simultaneously reset by the second alarm signal 35a via the third OR gate 36. The second alarm device 38 outputs an intense alarm to the vehicle driver in response to the output signal from the fourth counter 35 in an intense form such as a buzzer, vocal sound, or cooled wind ejection.

FIG. 12 is a simplified block diagram showing a seventh preferred embodiment of the drowsiness alarm system, wherein a vehicle speed sensor 16 is provided in the drowsiness alarm system of the fifth or sixth preferred embodiment. The outputs of the vehicle speed sensor 16 and the steering angle detection circuit 2 are inputted to the second AND gate 17, the output of which is connected to the frequency of steering detection circuit 18, which is shown in FIG. 7 and FIG. 8. The vehicle speed sensor 16 outputs a high-level signal 16a (logical "1") when the speed of the vehicle exceeds the predetermined value as described in the third preferred embodiment with reference to FIGS. 5A and 5B. In this preferred embodiment, the steering angle pulse 2a from the steering angle detection circuit 2 is fed into the frequency of steering detection circuit 18 only when the vehicle speed exceeds the predetermined value. Alternatively, the second AND gate 17 may be inserted between the frequency of steering detection circuit 18 and alarm unit 10 while still receiving the output of the vehicle speed sensor as an input as shown in FIG. 13. Therefore, the alarm signal 30a from the frequency of steering detection circuit 18 is fed into the alarm unit 10 only when the vehicle speed sensor 16 outputs the high-level signal (logic "1") (i.e., the speed of the vehicle exceeds the predetermined value.) Consequently, in the seventh preferred embodiment, the drowsiness alarm system can prevent an erroneous alarm due to the increase in the frequency of steering which occurs when the vehicle travels on a city street or at a low speed.

FIG. 14 shows the drowsiness alarm system of an eighth preferred embodiment, wherein in addition to the circuit blocks of steering angle sensor 1, steering angle detection circuit 2, quick steering detection circuit 13, and alarm unit 10 described in the first and second preferred embodiments shown by FIG. 1 and FIG. 3, the frequency of steering detection circuit 18 described in the fifth preferred embodiment shown by FIG. 7 and FIG. 8 is provided in parallel with the quick steering detection circuit 13, both output terminals connected to a fourth OR gate 40.

In this preferred embodiment, either of the pulses 19a(30a) from the frequency of steering detection circuit 18, outputted when the counted number of the steering angle pulses 6a reaches a predetermined value within a predetermined period of time, or the pulses 9a(15a) from the quick steering detection circuit 13, outputted when the change of steering angle over a predetermined time interval is carried out above a predetermined angular velocity (a quick steering is carried out), can be supplied to the alarm unit 10 to produce an alarm to the vehicle driver so that the driver's state of drowsiness can be detected more reliably.

FIG. 15 and FIG. 16 show a ninth preferred embodiment of the drowsiness alarm system according to the present invention, wherein the second AND gate 17, receiving the output of the vehicle speed sensor 16 as an input, is connected between the fourth OR gate 40 and the alarm unit 10 as shown in FIG. 15 or between the steering angle detection circuit 2 and both the quick steering and frequency of steering detection circuits 13 and 18 respectively, as shown in FIG. 16. The function of the vehicle speed sensor 16 and the second AND gate 17 has been described hereinbefore.

FIG. 17 shows the drowsiness alarm system of a tenth preferred embodiment, wherein in addition to the drowsiness alarm system described in the eighth preferred embodiment shown by FIG. 14, a vehicle condition responsive circuit denoted by 101 is provided and a fifth AND gate 67 receiving the output of the vehicle condition responsive circuit as an input connected between the steering angle detection circuit 2 and both the quick steering and the frequency of steering detection circuits 13 and 18 respectively. The fifth AND gate 67 may be provided between the fourth OR gate 40 and the alarm unit 10 as shown in FIG. 18. Since the internal circuits and operations of the steering angle sensor 1, steering angle detection circuit 2, frequency of steering detection circuit 18, and quick steering detection circuit 13 are already described hereinbefore, these internal circuits and operations are omitted hereinafter.

The vehicle condition responsive circuit 101 comprises:

(a) a turn signal indicator switch 41 which outputs a high-level voltage signal 41a when a turn signal indicator lamp switch of the vehicle is turned on;

(b) a fourth inverter 42, connected to the turn signal indicator switch 41, which inverts the output voltage signal 41a from the turn signal indicator switch 41;

(c) a fourth differentiator 43, connected to the fourth inverter 42, which differentiates the inverted output signal of the fourth inverter 42 so as to detect the falling edge of the output high-level voltage signal 41a of the turn signal indicator switch 42;

(d) a fifth timer 44, connected to the fourth differentiator 43, which outputs a high-level voltage signal 44a for a predetermined period of time in response to a high-level pulse signal from the fourth differentiator 43;

(e) a fifth (inclusive) OR gate 45 which passes a high-level voltage signal upon receipt of the signals from the turn signal indicator switch 41 and/or the fifth timer 44;

(f) a brake pedal operation sensor 46 which turns on and generates a high-level voltage signal 46a upon the depression of a brake pedal of the vehicle;

(g) a fifth inverter 47, connected to the brake pedal operation sensor 46, which inverts the level of the output signal 46a from the brake pedal operation sensor 46;

(h) a fifth differentiator 48, connected to the fifth inverter 47, which differentiates the output signal of the fifth inverter 47 so as to detect the falling edge of the high-level voltage signal 46a of the brake pedal operation sensor 46;

(i) a sixth timer 49, connected to the fifth differentiator 48, which outputs a high-level voltage signal 49a for a predetermined period of time in response to a high-level pulse from the fifth differentiator 48;

(j) a sixth (inclusive) OR gate 50 which produces a high-level signal in response to either or both of the high-level output signals from the brake pedal operation sensor 46 and from the sixth timer 49;

(k) an acceleration/deceleration sensor 51 comprising, e.g., a potentiometer or switch, etc., which turns on (e.g., generates a high-level voltage signal 51a) when the degree of depression to an accelerator pedal is within a predetermined range (e.g., one-fifth to four-fifths assuming that the state of releasing from the accelerator pedal is zero and the state of depressing the accelerator pedal at a maximum is one);

(l) the vehicle speed sensor 16 which turns on (generates a high-level voltage signal 16a) when the vehicle speed exceeds a predetermined value as described in the third preferred embodiment;

(m) a selector lever position sensor 60 which turns on (generates a high-level voltage signal 60a) when the gear selector lever of the vehicle is shifted to either a top position or overdrive position;

(n) seventh, eighth, and ninth timers 52, 56, and 61 which output high-level voltage signals respectively for a predetermined period of time when the acceleration/deceleration sensor 51, vehicle speed sensor 16, and selector lever position sensor 60 are turned on, respectively;

(o) sixth, seventh, and eighth inverters 53, 57, and 62, connected to the seventh, eighth, and ninth timers 52, 56, and 61, respectively, which invert the output signals from the respective seventh, eighth, and ninth timers 52, 56, and 61;

(p) a sixth AND gate 54, connected to the acceleration/deceleration sensor 51 and the sixth inverter 53, which performs a logical AND operation on the output signals 51a and 53a of both acceleration/deceleration sensor 51 and the sixth inverter 53 respectively;

(q) a seventh AND gate 58, connected to the vehicle speed sensor 16 and seventh inverter 57, which performs a logical AND operation on the output signals 16a and 57a of the vehicle speed sensor 16 and 57a of the seventh inverter 57;

(r) an eighth AND gate 63, connected to the selector lever position sensor 60 and the eighth inverter 62, which performs a logical AND operation on the output signals 60a and 62a from the selector lever position sensor 60 and the eighth inverter 62;

(s) ninth, tenth, and eleventh inverters 55, 59, and 64, connected to the sixth, seventh, and eighth AND gates 54, 58, and 63, which invert the output signals from the AND gate circuits 54, 58, and 63, respectively. (The combination of each of the sixth, seventh, and eighth AND gates 54, 58, and 63 and the corresponding ninth, tenth, and eleventh inverters 55, 59, and 64 constitutes a NAND gate.); and (t) a NOR gate, comprising an OR gate 65 connected serially to a twelfth inverter 66, connected to the fifth OR gate circuit 45, sixth OR gate circuit 50, ninth, tenth, and eleventh inverters 55, 59, and 64 respectively, which takes the logical NOR of the output signals of the fifth and sixth OR gates 45 and 50 respectively and the ninth, tenth, and eleventh inverters 55, 59, and 64 respectively.

In the tenth preferred embodiment of the construction described above, the steering angle detection circuit 2 outputs a pulse 6a whenever an angle of the steering wheel rotation exceeds a predetermined angle range in response to an input signal 1a from the steering angle sensor 1 in proportion to an angle of the steering wheel rotation with respect to the equilibrium position. On the other hand, the fifth OR gate 45 outputs a high-level voltage signal when the turn signal indicator switch 41 is turned on and until a predetermined period of time after the turn signal indicator switch 41 is turned off. When the brake pedal operation sensor 46 is turned on, a high-level voltage signal is outputted from the sixth OR gate 50 from the time the brake operation sensor 46 is turned on and until a predetermined period of time after the brake operation sensor 46 is turned off. The sixth AND gate 54 outputs a high-level voltage signal indicating that the vehicle travels at a constant speed without abrupt acceleration or deceleration after a predetermined period of time after the vehicle driver moves the accelerator pedal to within a predetermined range of stroke. The seventh AND gate 58 outputs a high-level voltage signal indicating that the vehicle travels at a high speed above a predetermined value on a highway or freeway after a predetermined time period after the vehicle speed exceeds the predetermined value of speed. After a predetermined period of time after the gear selector lever position sensor 60 is turned on, the eighth AND gate 63 outputs a high-level voltage signal indicating that the vehicle travels in a monotonous state such as at a steady speed.

Therefore, since the amount of drowsiness of the driver is reduced during the operation of the turn signal indicator or operation of the brake pedal, the output high-level signals of the fifth and sixth OR gates 45 and 50 representing such states as described above are inverted by means of the inverting portion of the NOR gate (65 and 66) to inhibit the steering angle pulse of the steering angle detection circuit 2 from passing through the fifth AND gate 67. Thus, the frequency of steering detection circuit 18 and the quick steering detection circuit 13 do not count any steering angle pulses, and no alarm is produced. However, since the driver's level of drowsiness may be increased during steady-state traveling, high speed traveling, or monotonous traveling conditions, as opposed to the above-described states, the output signals from the sixth, seventh, and eighth AND gates 54, 58, and 63 are sent into the fifth AND gate 67 via the ninth, tenth, and eleventh inverters 55, 59, and 64 to enable the steering angle pulse to pass through the fifth AND gate 67. In other words, the output signals of the sixth, seventh, and eighth AND gates 54, 58, and 63 only inhibit the counting of the steering angle pulse during abrupt acceleration or deceleration, low-speed traveling in a city street, or frequent shifting of the gear selector lever to the top or overdrive position. The steering angle pulse passed through the fifth AND gate 67 is fed to both the frequency of steering detection circuit 18 and the quick steering detection circuit 13. When the counted number reaches a predetermined value within a predetermined period of time, or quick steering occurs, the first and second alarm signals are sent into the alarm unit 10 to elicit an alarm. In the normal case, since the frequency of steering is increased when the amount of drowsiness begins to increase, the alarm is given in response to a first alarm signal 19a(30a) from the frequency of steering detection circuit 18. When the alarm by the first alarm signal does not make the driver wake-up sufficiently, a second alarm pulse signal 9a(15a) from the quick steering detection circuit 13 causes the alarm unit 10 to give another alarm since the increase in the level of drowsiness can be a cause of abrupt steering.

Figure 19:
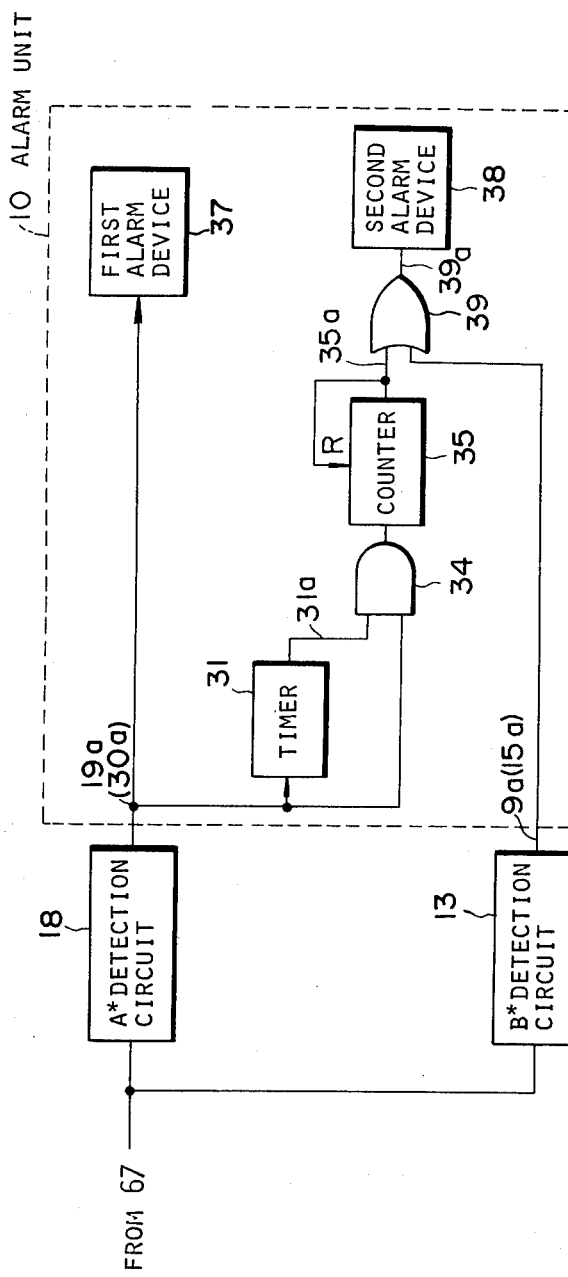
FIG. 19 is a simplified circuit block diagram showing an eleventh preferred embodiment of the drowsiness alarm system according to the present invention.

FIG. 19 is a simplified circuit block diagram of an eleventh preferred embodiment according to the present invention. In this preferred embodiment shown in FIG. 19, the construction of the alarm unit 10 is modified from the tenth preferred embodiment shown in FIG. 17. In particular, the alarm unit 10 comprises:

(1) the first alarm device 37 connected to the frequency of steering detection circuit 18 which produces a pictorial display, and/or the blinking of a lamp, and/or a vocal sound to attract the driver's attention as described in the sixth preferred embodiment;

(2) a fourth timer 31 which outputs a high-level voltage signal 31a for a predetermined period of time whenever the first alarm signal 19a(30a) from the frequency of steering detection circuit 18 is inputted;

(3) a fourth AND gate 34, connected to the fourth timer 31 and the frequency of steering detection circuit 18, which performs a logical AND operation on the output signals of the fourth timer 31 and the frequency of steering detection circuit 18;

(4) a fourth counter 35, connected to the output terminal of the fourth AND gate 34, which counts the first alarm pulses 19a(30a) which pass through the fourth AND gate 34, outputs a third alarm pulse signal 35a when the counted number reaches a predetermined numerical value, and is reset to zero by feeding back the third alarm signal 35a;

(5) a seventh OR gate 39, connected to the output terminals of counter 35 and the quick steering detection circuit 13, which takes a logical OR of the third alarm signal 35a and second alarm signal 9a(15a);

(6) the second alarm device 38 which gives an intense alarm such as buzzer, vocal sound, cold air ejection, etc. as described in the sixth preferred embodiment shown by FIG. 10, in response to the output signal from the seventh OR gate circuit 39.

In operation, the frequency of steering detection circuit 18 outputs the first alarm signal to the first alarm device 37 which gives the first alarm to the driver. The first alarm is intended to be a gentle alarm to attract the attention of the driver. Simultaneously, the fourth timer 31 is actuated for a predetermined period of time in response to the first alarm signal 19a(30a) to generate a high-level voltage signal signal 31a during the predetermined time period. If the first alarm signal 19a(30a) is outputted while the fourth timer 31 is outputting the high-level voltage signal 31a for the predetermined period of time, the fourth counter 35 counts the number of the inputted first alarm signals 19a(30a). When the counted value reaches a predetermined numerical value, the third alarm signal 35a is outputted. The second alarm device 38 gives an intense alarm in response to the second and/or third alarm signals.

As described above, the alarm system is provided for a vehicle. The alarm is inhibited when the turn signal indicator light is turned on and during a predetermined period of time after the turn signal indicator light is turned off, when the brake pedal is depressed and during a predetermined period of time after the brake pedal is released, when the accelerator pedal is operated at either of the maximum or minimum strokes and during a predetermined period of time after the accelerator pedal is moved to within a predetermined range of stroke, when the vehicle speed is below a predetermined speed value and during a predetermined period of time after the vehicle speed increases above the predetermined speed value, or when the selector lever is shifted at a position except a top or overdrive position and during a predetermined period of time after the selector lever is shifted at the top or overdrive position. Except the above-described cases, when the vehicle driver turns the steering wheel such that the frequency of steering beyond a particular range exceeds a predetermined number within a predetermined period of time and/or the vehicle driver turns the steering wheel after a predetermined period of no steering so quickly as to exceed a predetermined angular velocity over a predetermined range of steering changes, the drowsiness alarm system produces an alarm to the vehicle driver.

Figure 20:
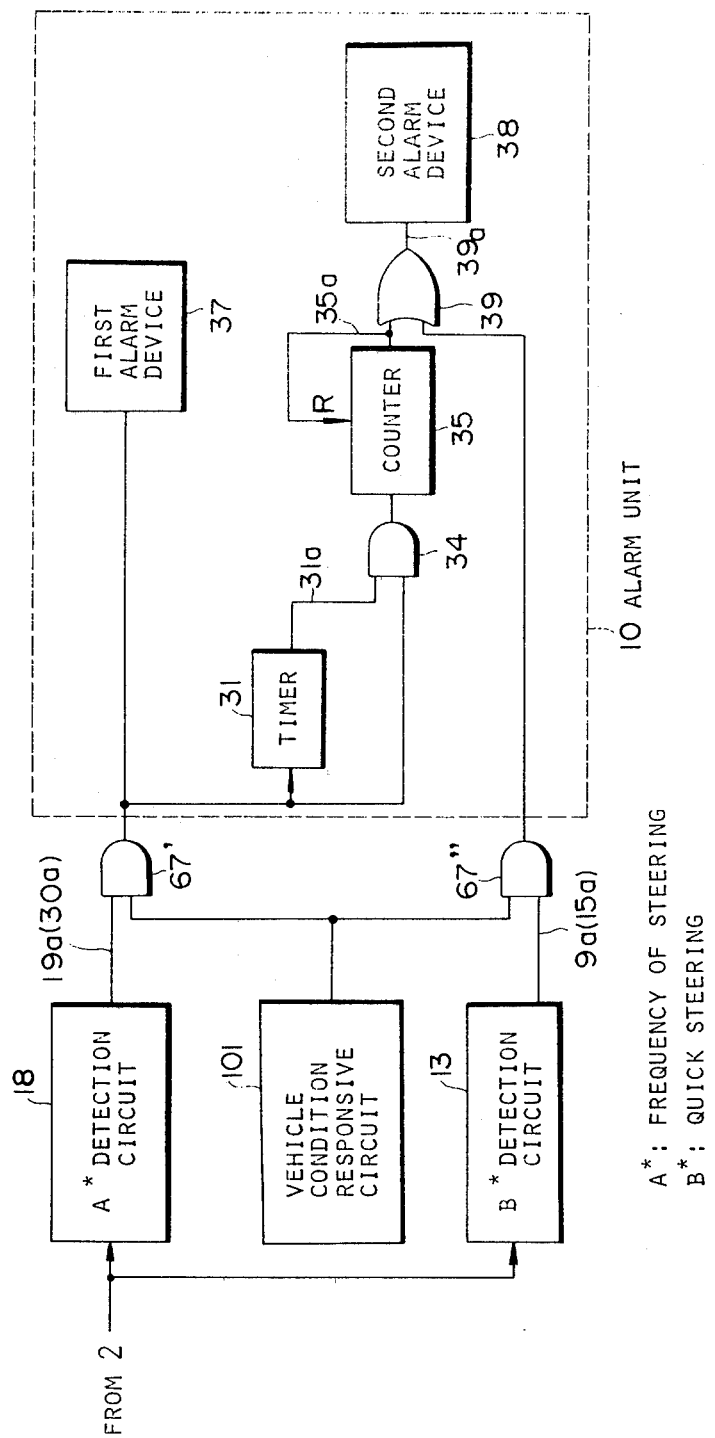
FIG. 20 is a simplified circuit block diagram showing another example of the eleventh preferred embodiment shown in FIG. 19.

FIG. 20 shows another example of the eleventh preferred embodiment shown in FIG. 19. Therefore, since the construction of the alarm unit 10 is the same as shown in FIG. 19, ninth and tenth AND gates 67' and 67" respectively are provided between frequency of steering detection circuit 18 and the alarm unit 10 and between the quick steering detection circuit 13 and the alarm unit 10, respectively, both being connected to the vehicle condition responsive circuit 101.

FIG. 21A and FIG. 21B show a twelfth preferred embodiment of the drowsiness alarm system, wherein the vehicle condition responsive circuit 101 is included and the fifth AND gate 67, receiving the output of the vehicle condition responsive circuit 101 as an input, is provided between the quick steering circuit 13, the construction of which is shown as in FIG. 1 and FIG. 3, respectively and the alarm unit 10.

FIG. 22 shows another example of the twelfth preferred embodiment shown in FIG. 21A and FIG. 21B, respectively, wherein the vehicle condition responsive circuit 101 and fifth AND gate circuit 67 are inserted between the steering angle detection circuit 2 and the quick steering detection circuit 13.

FIGS. 23 and 24 show a thirteenth preferred embodiment wherein the vehicle condition responsive circuit 101 and fifth AND gate circuit 67 are provided between the steering angle detection circuit 2 and the frequency of steering detection circuit 18 as shown in FIG. 23 or between the frequency of steering detection circuit 18 and the alarm unit 10 as shown in FIG. 24.

Therefore, according to the present invention, the increase in the level of drowsiness can be reliably detected in response to operational conditions most indicative of deep drowsiness.

It will be fully understood by those skilled in the art that the foregoing description is in terms of preferred embodiments of the present invention wherein verious changes and modifications may be made without departing from the spirit and scope of the present invention, which is to be defined by the appended claims.

What is claimed is:

1. A drowsiness alarm system for a vehicle for producing a warning in the event of driver drowsiness as determined from vehicle steering changes, comprising:
   (a) an alarm unit which produces an alarm in a predetermined form in response to a pulse inputted thereto;
   (b) a steering angle sensor which generates a signal indicative of the angle through which a steering wheel is turned;
   (c) a steering angle detection circuit, connected to said steering angle sensor, which outputs a pulse each time the vehicle steering angle changes by a predetermined amount; and
   (d) a quick steering detection circuit, connected to said steering angle detection circuit, for outputting a pulse to said alarm unit whenever the number of pulses from said steering angle detection circuit inputted thereto within a predetermined period of time following receipt of the first of said steering angle detection circuit pulses exceeds a predetermined number,
   whereby said alarm unit is activated in response to detection of an abrupt or sudden steering operation.

2. A drowsiness alarm system for a vehicle for providing a warning in the event of driver drowsiness as determined from vehicle steering changes, comprising:
   (a) an alarm unit which produces an alarm in a predetermined form in response to a pulse inputted thereto;
   (b) a steering angle sensor which generates a signal indicative of the angle through which a steering wheel is turned;
   (c) a steering angle detection circuit, connected to said steering angle sensor, which outputs a pulse each time the vehicle steering angle changes by a predetermined amount; and
   (d) a frequency of steering detection circuit, connected to said steering angle detection circuit, for outputting a pulse to said alarm unit whenever the pulses from said steering angle detection circuit have a predetermined timed relationship with one another and the number of such pulses within a predetermined period of time exceeds a predetermined number whereby the alarm is produced whenever the number of steering operations exceeding the predetermined amount of change of the steering angle within the predetermined period of time exceeds the predetermined number.

3. A drowsiness alarm system for a vehicle as set forth in claim 1, which further comprises:
   (a) a frequency of steering detection circuit, connected between said steering angle detection circuit and said alarm unit, which outputs a pulse to said alarm unit whenever the pulses from said steering angle detection circuit have a predetermined timed relationship with one another and the number of such pulses within a second predetermined period of time exceeds a second predetermined number whereby the alarm is produced when the number of steering operations exceeding the predetermined amount of change of the steering angle within the second predetermined period of time exceeds the second predetermined number, and
   whereby the alarm unit provides the alarm indication in response to a pulse from said quick steering detection circuit or from said frequency of steering detection circuit.

4. A drowsiness alarm system for a vehicle as set forth in claim 1, which further comprises:
   (a) a vehicle speed sensor which outputs a high-level voltage signal when the vehicle speed exceeds a predetermined value; and
   (b) an AND gate, one of two input terminals of which is connected to said quick steering detection circuit, the other input terminal of which is connected to said vehicle speed sensor, and an output terminal of which is connected to said alarm unit for enabling the pulse from said quick steering detection circuit to pass therethrough to said alarm unit only when said vehicle speed sensor sends the high-level voltage signal thereto.

5. A drowsiness alarm system for a vehicle as set forth in claim 1, which further comprises:
   (a) a vehicle speed sensor which outputs a high-level voltage signal when the vehicle speed exceeds a predetermined value; and
   (b) an AND gate, one of two input terminals of which is connected to said steering angle detection circuit, the other input terminal of which is connected to said vehicle speed sensor, and an output terminal of which is connected to said quick steering detection circuit for enabling the pulse from said steering angle detection circuit to pass therethrough to said quick steering detection circuit only when said vehicle speed sensor sends the first high-level voltage signal thereto.

6. A drowsiness alarm system for a vehicle as set forth in claim 2, which further comprises:
   (a) a vehicle speed sensor which outputs a high-level voltage signal when the vehicle speed exceeds a predetermined value; and
   (b) an AND gate, one of two input terminals of which is connected to said frequency of steering detection circuit, the other input terminal of which is connected to said vehicle speed sensor, and an output terminal of which is connected to said alarm unit for passing the pulse from said frequency of steering detection circuit therethrough to said alarm unit only when said vehicle speed sensor sends the high-level voltage signal thereto.

7. A drowsiness alarm system for a vehicle as set forth in claim 2, which further comprises:
   (a) a vehicle speed sensor which outputs a high-level voltage signal when the vehicle speed exceeds a predetermined value; and
   (b) an AND gate, one of two input terminals of which is connected to said steering angle detection circuit, the other input terminal of which is connected to said vehicle speed sensor, and an output terminal of which is connected to said frequency of steering detection circuit for passing the pulse from said steering angle detection circuit therethrough to said frequency of steering detection circuit only when said vehicle speed sensor sends the high-level voltage signal thereto.

8. A drowsiness alarm system for a vehicle as set forth in claim 3, wherein output terminals of both said quick steering detection circuit and said frequency of steering detection circuits are connected to said alarm unit via a common OR gate and which further comprises:
   (a) a vehicle speed sensor which outputs a high-level voltage signal when the vehicle speed exceeds a predetermined value; and
   (b) an AND gate, one of two input terminals of which is connected to said steering angle detection circuit, the other input terminal of which is connected to said vehicle speed sensor and an output terminal of which is connected to both said quick steering detection circuit and to said frequency of steering angle detection circuits, for enabling the pulse from said steering angle detection circuit to pass therethrough to both said quick steering circuit and to said frequency of steering angle detection circuit only when said vehicle speed sensor sends the high-level voltage signal thereto.

9. A drowsiness alarm system for a vehicle as set forth in claim 3, wherein output terminals of both said quick steering and frequency of steering detection circuits are input to a common OR gate and which further comprises:
   (a) a vehicle speed sensor which outputs a high-level voltage signal when the vehicle speed exceeds a predetermined value; and
   (b) an AND gate, one of two input terminals of which is connected to an output terminal of said OR gate, the other input terminal of which is connected to said vehicle speed sensor, and an output terminal of which is connected to said alarm unit, for enabling the pulses from said quick steering detection circuit and from said frequency of steering detection circuit respectively provided via said OR gate to pass therethrough to said alarm unit only when said vehicle speed sensor sends the high-level voltage signal thereto.

10. A drowsiness alarm system for a vehicle as set forth in claim 1, which further comprises:
    (a) a vehicle condition responsive circuit which generates a high-level voltage signal only when detecting from various vehicle operating conditions except a vehicle steering condition that the vehicle travels in such a monotonous state as to make the vehicle driver drowsy; and
    (b) an AND gate, one of two input terminals of which is connected to said steering angle detection circuit, the other input terminal of which is connected to said vehicle condition responsive circuit, and an output terminal of which is connected to said quick steering detection circuit for enabling the pulse from said steering angle detection circuit to pass therethrough to said quick steering detection circuit only when said vehicle condition responsive circuit sends the high-level voltage signal thereto.

11. A drowsiness alarm system for a vehicle as set forth in claim 1, which further comprises:
    (a) a vehicle condition responsive circuit which generates a high-level voltage signal only when detecting from various vehicle operating conditions except a vehicle steering condition that the vehicle travels in such a monotonous state as to make the vehicle driver drowsy; and
    (b) an AND gate, one of two input terminals of which is connected to said quick steering detection circuit, the other input terminal of which is connected to said vehicle condition responsive circuit, and an output terminal of which is connected to said alarm unit for enabling the pulse from said quick steering detection circuit to pass therethrough to said alarm unit only when said vehicle condition responsive circuit sends the high-level voltage signal thereto.

12. A drowsiness alarm system for a vehicle as set forth in claim 2, which further comprises:
    (a) a vehicle condition responsive circuit which generates a high-level voltage signal only when detecting from various vehicle operating conditions except a vehicle steering condition that the vehicle travels in such a monotonous state as to make the vehicle driver drowsy; and
    (b) an AND gate, one of two input terminals of which is connected to said steering angle detection circuit, the other input terminal of which is connected to said vehicle condition responsive circuit, and an output terminal of which is connected to said frequency of steering detection circuit for enabling the pulse from said steering angle detection circuit to pass therethrough to said frequency of steering detection circuit only when said vehicle condition responsive circuit sends the high-level voltage signal thereto.

13. A drowsiness alarm system for a vehicle as set forth in claim 2, which further comprises:
   (a) a vehicle condition responsive circuit which generates a high-level voltage signal only when detecting from various vehicle operating conditions except a vehicle steering condition that the vehicle travels in such a monotonous state as to make the vehicle driver drowsy; and
   (b) an AND gate, one of two input terminals of which is connected to said frequency of steering detection circuit, the other input terminal of which is connected to said vehicle condition responsive circuit, and an output terminal of which is connected to said alarm unit for enabling the pulse from said frequency of steering detection circuit to pass therethrough to said alarm unit only when said vehicle condition responsive circuit sends the high-level voltage signal thereto.

14. A drowsiness alarm system for a vehicle as set forth in claim 3, wherein said quick steering and frequency of steering detection circuits each have an output terminal connected to said alarm unit via an OR gate and which further comprises:
   (a) a vehicle condition responsive circuit which generates a high-level voltage signal only when detecting from various vehicle operating conditions except a vehicle steering condition that the vehicle travels in such a monotonous state as to make the vehicle driver drowsy; and
   (b) an AND gate, one of two input terminals of which is connected to said steering angle detection circuit, the other input terminal of which is connected to said vehicle condition responsive circuit, and an output terminal of which is connected to input terminals of both said quick steering detection circuit and said frequency of steering detection circuit for enabling the pulse from said steering angle detection circuit to pass therethrough to both said quick steering detection circuit and to said frequency of steering detection circuit only when said vehicle condition responsive circuit sends the high-level voltage signal thereto.

15. A drowsiness alarm system for a vehicle as set forth in claim 3, wherein both said quick steering detection circuit and said frequency of steering detection circuit have output terminals connected to said alarm unit via an OR gate and which further comprises:
   (a) a vehicle condition responsive circuit which generates a high-level voltage signal only when detecting from various vehicle operating conditions except a vehicle steering condition that the vehicle travels in such a monotonous state as to make the vehicle driver drowsy; and
   (b) an AND gate, one of two input terminals of which is connected to the output terminal of said OR gate, the other input terminal of which is connected to said vehicle condition responsive circuit, and an output terminal of which is connected to said alarm unit for enabling pulses passed through said OR gate from either said quick steering detection circuit or said frequency of steering detection circuit to pass therethrough to said alarm unit only when said vehicle condition responsive circuit sends the high-level voltage signal thereto.

16. A drowsiness alarm system for a vehicle as set forth in any one of claims 1 through 15, wherein said steering angle detection circuit comprises:
   (a) a positive peak detector, connected to said steering angle sensor, which holds and outputs a local maximum level of the output signal from said steering angle sensor, decreasing the held maximum level by a reference voltage, corresponding to a predetermined change of angle, when reset;
   (b) a negative peak detector, connected to said steering angle sensor, which holds and outputs a local minimum level of the output signal from said steering angle sensor, increasing the held minimum level by the reference voltage, corresponding to the predetermined change of angle, when reset;
   (c) a differential amplifier, connected to output terminals of both said positive and said negative peak detectors, which outputs a difference voltage signal according to the difference between output signals from said positive and negative peak detectors; and
   (d) a comparator, connected to said differential amplifier, which compares the difference voltage signal with a predetermined voltage and generates the pulse output of said steering angle detection circuit when the difference voltage signal reaches the predetermined voltage, the generated output pulse resetting said positive and negative peak detectors.

17. A drowsiness alarm system for a vehicle as set forth in any one of claims 1, 3 through 5, 8 through 11, 14 and 15, wherein said quick steering detection circuit comprises:
   (a) a monostable multivibrator which outputs a high-level voltage signal for a predetermined period of time in response to the pulse from said steering angle detection circuit;
   (b) an AND gate connected between said steering angle detection circuit and an input terminal of said monostable multivibrator;
   (c) an inverter connected between an input terminal of said AND gate connected to said monostable multivibrator, on the one hand, and an output terminal of said monostable multivibrator on the other hand, for outputting an inverted signal of the output signal of said monostable multivibrator to an input terminal of said AND gate associated therewith;
   (d) a counter, connected between said steering angle detection circuit and said alarm unit, which counts the number of inputted pulses from said steering angle detection unit during the time when the high-level voltage signal from said monostable multivibrator is inputted thereto and which outputs the quick steering detection pulse when the counted number reaches the predetermined number.

18. A drowsiness alarm system for a vehicle as set forth in any one of claims 1, 3 through 5, 8 through 11, 14, and 15, wherein said quick steering detection circuit comprises:
   (a) a monostable multivibrator, connected to said steering angle detection circuit, which outputs a high-level voltage signal for a predetermined period of time whenever the pulse from said steering angle detection circuit is inputted thereto;
   (b) an integrator, connected to said monostable multivibrator, which integrates the high-level voltage signal fed from said monostable multivibrator; and (c) a comparator, connected to said integrator for comparing the integrated voltage signal from said integrator with a predetermined voltage and for outputting the quick steering detection pulse when the integrated voltage exceeds a predetermined voltage level.

19. A drowsiness alarm system for a vehicle as set forth in any one of claims 2, 3, 6 through 9, 12 through 15, wherein said frequency of steering detection circuit comprises:
(a) a timer which generates a pulse whenever a predetermined period of time has passed;
(b) a counter, connected to said steering angle detection circuit, which counts the number of the pulses fed from said steering angle detection circuit, and is reset by the pulse fed from said timer, and which outputs the frequency of steering detection pulse when the counted number reaches a predetermined number.

20. A drowsiness alarm system for a vehicle as set forth in any of claims 2, 3, 6 through 9, or 12 through 15, wherein said frequency of steering detection circuit comprises:
(a) a first timer, connected to said steering angle detection circuit, for outputting a high-level voltage signal for a predetermined period of time whenever the pulse from said steering angle detection circuit is received;
(b) a first differentiator, connected to said first timer, for differentiating the high-level voltage signal fed from said first timer and outputting a first differentiated pulse signal responsive to the rising edge of the high-level voltage signal outputted from said first timer;
(c) an inverter, connected to said first timer, which inverts the level of the output voltage signal of said first timer;
(d) a second differentiator, connected to said inverter, for differentiating the inverted voltage signal fed from said inverter and outputting a second differential pulse signal responsive to the falling edge of the high-level voltage signal outputted from said first timer;
a second timer, connected to said first differentiator, which starts counting the time in response to the first differentiated pulse signal from said first differentiator and outputs a pulse whenever the counted time reaches a predetermined value, and which is reset by the second differentiated pulse signal from said second differentiator;
(f) a primary OR gate, connected to said second timer and said second differentiator;
(g) a flip-flop, the set terminal of which is connected to said first differentiator and reset terminal is connected to said primary OR gate, and which is set by the first differentiated pulse signal from said first differentiator to output a further high-level voltage signal from a Q output terminal thereof, and which is reset by the output signal of said primary OR gate;
(h) a counter AND gate connected to said flip-flop and to said steering angle detection circuit;
(i) a counter, connected to said counter AND gate, which counts the number of pulses fed from said steering angle detection circuit via said counter AND gate passed while said flip-flop sends the further high-level voltage signal to said counter AND gate, and which outputs the quick steering detection pulse when the counter number of the pulses from said steering angle detection circuit reaches a predetermined number; and
(j) a secondary OR gate, connected to said primary OR gate and to an output terminal of said counter, for sending the output signals from either said primary OR gate or said counter to a reset terminal of said counter as a reset signal.

21. A drowsiness alarm system for a vehicle as set forth in any one of claims 10 through 15, wherein said vehicle condition responsive circuit comprises:
(a) a first circuit, responsive to the operation of a turn signal indicator light of the vehicle, which outputs a first high-level voltage signal when a driver turns on a turn signal indicator switch and until a predetermined period of time after the driver turns off the turn signal indicator switch;
(b) a second circuit, responsive to the depression of a brake pedal of the vehicle, which outputs a second high-level voltage signal when the driver depresses the brake pedal and until a predetermined period of time after the driver releases the brake pedal;
(c) a third circuit, responsive to the operation of an accelerator pedal of the vehicle, which outputs a third high-level voltage signal when the driver nearly fully depresses or releases the accelerator pedal to a position outside a predetermined range of stroke and until a predetermined period of time after a time when the driver operates the accelerator pedal at the predetermined range of stroke;
(d) a fourth circuit, responsive to a vehicle speed, which outputs a fourth high-level voltage sgnal when the vehicle speed is below a predetermined value and until a predetermined period of time after the vehicle speed exceeds the predetermined value;
(e) a fifth circuit, responsive to the operation of a gear selector lever, which outputs a fifth high-level voltage signal when the gear selector lever is placed at any position except top and overdrive positions and until a predetermined period of time after the gear selector lever is shifted to either of the top and overdrive positions from any other position; and
(f) a NOR gate, connected to said first, second, third, fourth, and fifth circuits, which sends an inverted form of the high-level voltage signal of said vehicle condition responsive circuit to said AND gate when any of the high-level voltage signals from said first, second, third, fourth and fifth circuits are received.

22. A drowsiness alarm system for a vehicle as set forth in claim 21, wherein said first circuit comprises:
(a) a turn signal indicator switch which outputs a high-level voltage signal when a vehicle's turn signal indicator light is turned on;
(b) an inverter, connected to said turn signal indicator switch, which inverts the output signal level of said turn signal indicator switch;
(c) a differentiator, connected to said inverter, which differentiates the output inverted signal of said inverter so as to detect the falling edge of the high-level voltage signal of said turn signal indicator switch when the turn signal indicator light is turned off;
(d) a timer, connected to said differentiator, which outputs a high-level voltage signal for a predetermined period of time upon receiving the differentiated signal of said differentiator responsive to the falling edge of the high-level voltage signal of said turn signal indicator switch; and (e) an OR gate, connected to said turn signal indicator switch and timer, which outputs the first high-level voltage signal in response to the high-level voltage signals from both said turn signal indicator switch and said timer.

23. A drowsiness alarm system for a vehicle as set forth in claim 21, wherein said second circuit comprises:

(a) a brake pedal operation sensor which outputs a high-level voltage signal when the brake pedal is depressed;

(b) an inverter, connected to said brake pedal operation sensor, which inverts the output signal level from said brake pedal operation sensor;

(c) a differentiator, connected to said inverter, which differentiates the output signal of said inverter so as to detect the falling edge of the high-level voltage signal of said brake pedal operation sensor when the brake pedal is depressed;

(d) a timer, connected to said differentiator, which outputs a high-level voltage signal for a predetermined period of time upon receiving the differentiated signal of said differentiator responsive to the falling edge of the high-level voltage signal of said brake pedal operation sensor; and (e) an OR gate, connected to said brake pedal operation sensor and said fifth timer, which outputs the second high-level voltage signal in response to the high-level voltage signals from said brake pedal operation sensor and said timer.

24. A drowsiness alarm system for a vehicle as set forth in claim 21, wherein said third circuit comprises:

(a) an acceleration/deceleration sensor, which outputs a high-level voltage signal when the accelerator pedal of the vehicle is depressed or released to within a predetermined range of stroke with respect to the extreme strokes of the accelerator pedal;

(b) a timer, connected to said acceleration/deceleration sensor, which outputs a high-level voltage signal for a predetermined period of time after the high-level voltage signal is inputted thereto from said acceleration/deceleration sensor;

(c) an inverter, connected to said timer, which inverts the output signal level from said timer;

(d) a second AND gate, connected to said acceleration/deceleration sensor and to said inverter, which takes the logical AND between the output signals from both said accelertion/deceleration sensor and said inverter, and outputs a high-level voltage signal when the predetermined period of time has passed after the accelerator pedal is depressed or released to within the predetermined range of stroke; and (e) a further inverter, connected to said second AND gate, which inverts the output signal of said AND gate so as to output the third high-level voltage signal when said AND gate sends a low-level voltage signal thereto.

25. A drowsiness alarm system for a vehicle as set forth in claim 21, wherein said fourth circuit comprises:

(a) a vehicle speed sensor which outputs a high-level voltage signal when the vehicle speed exceeds a predetermined value;

(b) a timer, connected to said vehicle speed sensor, which outputs a high-level voltage signal for a predetermined period of time in response to the high-level voltage signal from said vehicle speed sensor;

(c) an inverter, connected to said timer, which inverts the output signal level of said timer;

(d) a second AND gate, connected to said vehicle speed sensor and to said inverter, which takes the logical AND between the output signals of both said vehicle speed sensor and said inverter and outputs a high-level voltage signal indicating that the predetermined period of time has passed since the vehicle speed exceeded the predetermined value; and (e) an additional inverter, connected to said second AND gate, which inverts the output signal level of said AND gate and outputs the fourth high-level voltage signal when the output signal of said AND gate is at a low level.

26. A drowsiness alarm system for a vehicle as set forth in claim 21, wherein said fifth circuit comprises:

(a) a gear selector lever position sensor which outputs a high-level voltage signal when the gear selector lever is in either of the top or overdrive positions;

(b) a timer, connected to said gear selector lever position sensor, which outputs a high-level voltage signal for a predetermined period of time in response to the high-level voltage signal from said gear selector lever position sensor;

(c) an inverter, connected to said timer, which inverts the voltage level of the output signal of said timer;

(d) a second AND gate, connected to said gear selector lever position sensor and to said inverter, which takes the logical AND between the output signals of both said gear selector lever position sensor and said inverter and outputs a high-level voltage signal representing the predetermined period of time after the gear selector lever is shifted to either of the top and overdrive positions; and (e) a second inverter, connected to said second AND gate, which inverts the voltage level of the output signal from said AND gate and outputs the fifth high-level voltage signal when the voltage of the output signal from said AND gate is at a low level.

27. A drowsiness alarm system for a vehicle as set forth in any one of claims 2, 6, 7, 12 and 13, wherein said alarm unit comprises:

(a) a first alarm device, connected to said frequency of steering detection circuit, which gives a gentle alarm indication to the driver in response to the pulse fed from said frequency of steering detection circuit;

(b) a timer, connected to said frequency of steering detection circuit, which outputs a high-level voltage signal for a predetermined period of time in response to the pulse fed from said frequency of steering detection circuit;

(c) an inverter, connected to said timer, which outputs an inverter voltage signal when the high-level voltage signal from said timer is inputted;

(d) a differentiator, connected to said inverter, which differentiates the inverted voltage signal of said inverter to output a differentiated signal responsive to the falling edge of the high-level voltage signal outputted from said timer;

(e) a second AND gate, connected to said frequency of steering detection circuit and to said timer, which enables the pulse from said frequency of steering detection circuit to pass therethrough while the high-level voltage signal from said timer is received;

(f) a counter, connected to said second AND gate, which counts the number of the pulses passed via said second AND gate and outputs a pulse when the counted number of the pulses reaches a predetermined number;

(g) an OR gate, connected to said differentiator and to the output terminal of said counter, which sends the logical OR signal of the differentiated signal from said differentiator and the pulse from said counter into said counter for resetting said counter; and (h) a second alarm device, connected to said counter, which gives an intense alarm indication to the vehicle driver in response to the pulse from said counter.

28. A drowsiness alarm system for a vehicle as set forth in claim 3, which further comprises:

(a) a vehicle condition responsive circuit which generates a high-level voltage signal only when detecting that the vehicle travels in such a monotonous state as to make the vehicle driver drowsy;

(b) an AND gate, one of two input terminals of which is connected to said steering angle detection circuit, the other input terminal of which is connected to said vehicle condition responsive circuit, and an output terminal of which is connected to input terminals of both said quick steering detection circuit and said frequency of steering detection circuit for enabling the pulse from said steering angle detection circuit to pass therethrough both to said quick steering detection circuit and to said frequency of steering detection only when said vehicle condition responsive circuit sends the high-level voltage signal thereto, and wherein said alarm unit comprises:

(c) a first alarm device, connected to said frequency of steering detection circuit, which gives a gentle alarm indication to the driver;

(d) a timer, connected to said frequency of steering detection circuit, which outputs a high-level voltage signal for a predetermined period of time in response to the pulse fed from said frequency of steering detection circuit;

(e) a further AND gate, connected to said frequency of steering detection circuit and to said timer, which enables the pulse from said frequency of steering detection circuit to pass therethrough while the high-level voltage signal from said timer is received;

(f) a counter, connected to said further AND gate, which counts the number of the pulses passed via said further AND gate and outputs a further pulse when the counted number of pulses from said frequency of steering detection circuit reaches a predetermined number, and which is reset by the further pulse outputted therefrom;

(g) an OR gate, connected to said counter and to said quick steering detection circuit, which takes a logical OR of the further pulse of said counter and the pulse of said quick steering detection circuit; and (h) a second alarm device, connected to said OR gate, which generates an intense alarm to the vehicle driver in response to the output signal of said OR gate.

29. A drowsiness alarm system for a vehicle as set forth in claim 3, which further comprises:

(a) a vehicle condition responsive circuit which generates a high-level voltage signal only when detecting that the vehicle travels in such a monotonous state as to make the vehicle driver drowsy;

(b) a first AND gate, connected to said frequency of steering detection circuit and to said vehicle condition responsive circuit, which enables the pulse from said frequency of steering detection circuit to pass therethrough only when the high-level signal from said vehicle condition responsive circuit is received; and (c) a second AND gate, connected to said quick steering detection circuit and to said vehicle condition responsive circuit, which enables the pulse from said quick steering detection circuit to pass therethrough only when the high-level signal from said vehicle condition responsive circuit is received;

and wherein said alarm unit comprises:

(d) a first alarm device, connected to said first AND gate which gives a gentle alarm to the vehicle driver in response to a high-level voltage signal therefrom;

(e) a timer, connected to said first AND gate, which outputs a high-level voltage signal for a predetermined period of time in response to the pulse fed from said frequency of steering detection circuit via said first AND gate;

(f) a third AND gate, connected to said first AND gate and to said timer, which enables the pulse from said frequency of steering detection circuit via said first AND gate to pass therethrough while the high-level voltage signal from said timer is received;

a counter, connected to said third AND gate, which counts the number of pulses from said frequency of steering detection circuit passed via said third AND gate and outputs a pulse when the counted number of said pulses reaches a predetermined number, and which is reset by the pulse outputted therefrom;

(h) an OR gate, connected to said counter and said second AND gate, which takes a logical OR between the pulse of said counter and the pulse of said quick steering detection circuit via said second AND gate; and (i) a second alarm device, connected to said OR gate, which gives an intense alarm to the vehicle driver in response to the output signal of said OR gate.

30. A drowsiness alarm system as recited in claim 1 wherein said quick steering detection circuit comprises means for detecting a steering operation having a steering angle exceeding a predetermined integral multiple of the predetermined amount of change of the vehicle steering angle within the predetermined period of time.

* * * * *